US009110849B2

(12) United States Patent
Reznik

(10) Patent No.: US 9,110,849 B2
(45) Date of Patent: Aug. 18, 2015

(54) COMPUTING EVEN-SIZED DISCRETE COSINE TRANSFORMS

(75) Inventor: Yuriy Reznik, Seattle, WA (US)

(73) Assignee: QUALCOMM INCORPORATED, San Diego, CA (US)

( * ) Notice: Subject to any disclaimer, the term of this patent is extended or adjusted under 35 U.S.C. 154(b) by 168 days.

(21) Appl. No.: 12/758,959

(22) Filed: Apr. 13, 2010

(65) Prior Publication Data

US 2010/0266008 A1 Oct. 21, 2010

Related U.S. Application Data

(60) Provisional application No. 61/169,418, filed on Apr. 15, 2009.

(51) Int. Cl.
*H04N 7/12* (2006.01)
*G06F 17/14* (2006.01)
*H04N 19/122* (2014.01)
*H04N 19/61* (2014.01)
(Continued)

(52) U.S. Cl.
CPC ............ *G06F 17/147* (2013.01); *H04N 19/122* (2014.11); *H04N 19/134* (2014.11); *H04N 19/176* (2014.11); *H04N 19/61* (2014.11); *H04N 19/625* (2014.11); *H04N 19/30* (2014.11)

(58) Field of Classification Search
CPC ....................... H04N 19/00812; H04N 19/625
USPC ............................ 375/240.01, 240.2, 240.26
IPC ........................................................ H04N 7/12
See application file for complete search history.

(56) References Cited

U.S. PATENT DOCUMENTS 4,754,491 A 6/1988 Mischler et al.
5,278,646 A 1/1994 Civanlar et al.
(Continued)

FOREIGN PATENT DOCUMENTS

CN 1428719 A 7/2003
CN 1436004 A 8/2003
(Continued)

OTHER PUBLICATIONS

Cham, "Development of integer cosine transforms by the principle of dyadic symmetry," Communications, Speech and Vision, IEE Proceedings I , vol. 136, No. 4, pp. 276-282, Aug. 1989.
(Continued)

*Primary Examiner* — Young Lee
(74) *Attorney, Agent, or Firm* — Brent A. Boyd

(57) ABSTRACT

In general, techniques are described for computing even-sized discrete cosine transforms (DCTs). For example, a coding device may implement these techniques. The coding device includes a DCT-II unit that first determines whether a DCT-II to perform is a multiple of two, and in response to determining that the DCT-II to perform is a multiple of two, performs the DCT-II. To perform the DCT-II, the DCT-II unit computes a butterfly and reverses an order of a first sub-set of the outputs of the butterfly. The DCT-II unit then recursively subtracts the reverse-ordered first sub-set of the butterfly outputs. The DCT-II unit computes a sub-DCT-II for a second sub-set of the butterfly outputs and a sub-DCT-III for the recursively subtracted first set of butterfly outputs. The DCT-II unit reorders the outputs produced by the sub-DCT-II and sub-DCT-III to generate output values of the DCT-II.

38 Claims, 9 Drawing Sheets

(51) Int. Cl.

| | |
|---|---|
| ***H04N 19/176*** | (2014.01) |
| ***H04N 19/134*** | (2014.01) |
| ***H04N 19/625*** | (2014.01) |
| *H04N 19/30* | (2014.01) |

(56) References Cited

U.S. PATENT DOCUMENTS

| | | | |
|---|---|---|---|
| 5,408,425 | A | 4/1995 | Hou |
| 5,508,949 | A | 4/1996 | Konstantinides |
| 5,649,077 | A | 7/1997 | On et al. |
| 5,737,450 | A | 4/1998 | Hajjahmad et al. |
| 5,768,167 | A | 6/1998 | Kuroda |
| 5,959,675 | A | 9/1999 | Mita et al. |
| 6,029,185 | A | 2/2000 | Tonomura |
| 6,252,994 | B1 | 6/2001 | Nafarieh |
| 7,366,236 | B1 | 4/2008 | Winger |
| 7,412,100 | B2 | 8/2008 | Raveendran et al. |
| 7,437,394 | B2 | 10/2008 | Hou |
| 7,725,516 | B2 | 5/2010 | Liu |
| 2001/0054051 | A1 | 12/2001 | Tajime |
| 2002/0106020 | A1 | 8/2002 | Cheng et al. |
| 2003/0076904 | A1 | 4/2003 | Magee |
| 2003/0078952 | A1 | 4/2003 | Kim et al. |
| 2003/0078953 | A1 | 4/2003 | Hallapuro et al. |
| 2003/0093452 | A1 | 5/2003 | Zhou |
| 2003/0133507 | A1 | 7/2003 | Miro et al. |
| 2003/0152281 | A1 | 8/2003 | Tomita et al. |
| 2003/0177158 | A1 | 9/2003 | Zheltov et al. |
| 2004/0136602 | A1 | 7/2004 | Nagaraj et al. |
| 2005/0069035 | A1 | 3/2005 | Lu et al. |
| 2005/0141609 | A1 | 6/2005 | Malvar |
| 2005/0213835 | A1 | 9/2005 | Guangxi et al. |
| 2005/0281331 | A1 | 12/2005 | Hahm et al. |
| 2006/0126962 | A1 | 6/2006 | Sun |
| 2006/0165164 | A1 | 7/2006 | Kwan et al. |
| 2007/0025441 | A1 | 2/2007 | Ugur et al. |
| 2007/0156398 | A1 | 7/2007 | Hung et al. |
| 2007/0168410 | A1 | 7/2007 | Reznik |
| 2007/0200738 | A1 | 8/2007 | Reznik et al. |
| 2007/0233764 | A1 | 10/2007 | Reznik et al. |
| 2007/0297503 | A1 | 12/2007 | Reznik |
| 2008/0037656 | A1 | 2/2008 | Hannuksela |
| 2008/0049834 | A1 | 2/2008 | Holcomb et al. |
| 2009/0080515 | A1 | 3/2009 | Nagaraj et al. |
| 2009/0086816 | A1 | 4/2009 | Leontaris et al. |
| 2009/0141808 | A1 | 6/2009 | Wong |
| 2009/0157785 | A1 | 6/2009 | Reznik et al. |
| 2009/0180700 | A1 | 7/2009 | Kim et al. |
| 2010/0172409 | A1 | 7/2010 | Reznik et al. |
| 2010/0309974 | A1 | 12/2010 | Reznik |
| 2010/0312811 | A1 | 12/2010 | Reznik |
| 2010/0329329 | A1 | 12/2010 | Reznik et al. |
| 2011/0026846 | A1 | 2/2011 | Hsu et al. |
| 2011/0150078 | A1 | 6/2011 | Reznik et al. |
| 2011/0150079 | A1 | 6/2011 | Reznik et al. |
| 2011/0153699 | A1 | 6/2011 | Reznik et al. |
| 2012/0177108 | A1 | 7/2012 | Joshi et al. |
| 2013/0121406 | A1 | 5/2013 | Reznik et al. |
| 2013/0148718 | A1 | 6/2013 | Reznik et al. |

FOREIGN PATENT DOCUMENTS

| | | | |
|---|---|---|---|
| CN | 1455599 | A | 11/2003 |
| CN | 1149499 | C | 5/2004 |
| CN | 1617594 | A | 5/2005 |
| CN | 1791222 | A | 6/2006 |
| CN | 101047849 | A | 10/2007 |
| CN | 101330616 | A | 12/2008 |
| EP | 0917070 | A2 | 5/1999 |
| EP | 1359546 | A1 | 11/2003 |
| JP | H09212484 | A | 8/1997 |
| JP | 2003223433 | A | 8/2003 |
| JP | 2003281115 | A | 10/2003 |
| JP | 2007129731 | A | 5/2007 |
| KR | 1020010043396 | | 5/2001 |
| KR | 100545445 | B1 | 1/2006 |
| KR | 20060112255 | A | 10/2006 |
| TW | 284869 | A | 9/1996 |
| TW | I241074 | B | 10/2005 |
| TW | 200714076 | A | 4/2007 |
| TW | 200727578 | | 7/2007 |
| TW | 200741486 | A | 11/2007 |
| TW | I295455 | B | 4/2008 |
| TW | I310526 | B | 6/2009 |
| WO | WO9910818 | A1 | 3/1999 |
| WO | WO0159603 | A1 | 8/2001 |
| WO | 03019787 | A2 | 3/2003 |
| WO | 03019949 | A2 | 3/2003 |
| WO | 2009039451 | A2 | 3/2009 |
| WO | 2009042943 | A2 | 4/2009 |
| WO | WO2011005583 | A2 | 1/2011 |

OTHER PUBLICATIONS

Reznik et al., "On Design of Transforms for High-Resolution / High-Performance Video Coding," ISO/IEC JTC1/SC29/WG11, MPEG input document M16438, MPEG's 88th meeting, Maui, HI, Apr. 2009, pp. 23.

Heideman, "Computation of an Odd-Length DCT from a Real-Valued DFT of the Same Length," IEEE Trans. Signal Proc., vol. 40, No. 1, Jan. 1992.

Plonka et al., "Fast and numerically stable algorithms for discrete cosine transforms," Linear Algebra and Applications, vol. 394, No. 1, Jan. 2005, pp. 309-345.

Yuriy Reznik, et al., "Fast Algorithms for Computation of 5-Point DCT-II, DCT-IV, and DST-IV, and Architectures," U.S. Appl. No. 12/334,238, filed Dec. 12, 2008.

Xiong et al., "A Comparative Study of DCT-and Wavelet-Based Image Coding, IEEE Transactions on Circuits and Systems for Video Technology," vol. 9, No. 5, Aug. 1999, pp. 692-695.

Artieri A ., et al., "A one chip VLSI for real time two-dimensional discrete cosine transform", 1988 IEEE International Symposium on Circuits and Systems (ISCAS'88), Jun. 7-9, 1988, Espoo, Finland, Jun. 7, 1988, pp. 701-704, XP010069645.

C. Loeffler, A. Ligtenberg, and GS Moschytz, "Practical Fast 1-D DCT algorithms with 11 multiplications," Proc. IEEE International Conference on Acoustic, Speech, and Signal Proc. (ICASSP), vol. 2, pp. 988-991, May 1989.

Chan S-C et al: "Fast algorithms for computing the discrete cosine transform", IEEE Transactions on Circuits and Systems II : Analog and Digital Signal Processing, vol. 39, No. 3, Mar. 1992, pp. 185-190, XP000305256, ISSN: 1057-7130, DOI: 10.1109/82.127302.

Chivukula R K: "Fast algorithms for MDCT and low delay filterbanks used in audio coding", Master's Thesis, Electrical Engineering, The University of Texas at Arlington, USA, Aug. 8, 2008, XP007906591,Retrieved from the Internet:URL:http://dspace.uta.edu/handle/10106/921.

Dai X et al: "Fast algorithm for modulated complex lapped transform", IEEE Signal Processing Letters, vol. 16, No. 1, Jan. 2009, pp. 30-33, XP011239818, ISSN: 1070-9908, DOI : 10.1109/LSP.2008.2008434.

Dong et al., "2-D order-16 integer transforms for HD video coding", IEEE Transactions on Circuits and Systems for Video Technology, Oct. 2009, pp. 1462-1474, vol. 19, No. 10, XP011270110, ISSN: 1051-8215, DOI: 10. 1109/TCSVT.2009.2026792.

Feig E et al: "Scaled DCT's on input sizes that are composite", IEEE Transactions on Signal Processing, vol. 43, No. 1, Jan. 1995, pp. 43-50, XP000826361, I SSN: 1053-587X, DOI : 10.1109/78.365284.

Huang et al., "An Array -based Scalable Architecture for DCT Computations in Video Coding, IEEE International Conference Neural Networks & Signal Processing," Zhenjiang, China, Jun. 8-10, 2000, pp. 451-455.

International Search Report and Written Opinion—PCT/US2010/031314, ISA/EPO—Oct. 5, 2011.

J. Liang and T.D. Tran, "Fast Multiplierless Approximations of the DCT with the Lifting Scheme", IEEE Transactions on Signal Processing, vol. 49, No. 12, Dec. 2001, pp. 3032-3044.

(56) References Cited

OTHER PUBLICATIONS

Joshi et al., "Efficient large size transforms for high-performance video coding", Applications of Digital Image Processing XXXIII, Sep. 7, 2010, pp. 77980W-1-77980W-7, vol. 7798, Proceedings of SPIE, XP055007446, ISSN: 0277-786X, DOI: 10.1117/12.862250.
Joshi et al., "Simplified transforms for extended block sizes", ITU-T SG16 Q6 (VCEG), Document VCEG-AL30, 38TH VCEG Meeting, Jul. 6-10, 2009, Geneva, CH, Jul. 3, 2009, XP030003711, Retrieved from the Internet: URL: http://wftp3.itu.int/av-arch/video-site/0906_LG/VCEG-AL30.zip.
Karczewicz et al., "A hybrid video coder based on extended macroblock sizes, improved interpolation, and flexible motion representation", IEEE Transactions on Circuits and Systems for Video Technology, Dec. 2010, pp. 1698-1708, vol. 20, No. 12, XP011329406, ISSN: 1051-8215, DOI: 10. 1109/TCSVT.2010.2092614.
Karczewicz et al., "Video coding technology proposal by Qualcomm", ITU-T SG16 WP3 and ISO/IEC JTC1/SC29/WG11, Document JCTVC-A121, 1ST JCT-VC Meeting, Apr. 15-23, 2010, Dresden, Germany, May 18, 2010, pp. 1-24, XP030007567, Retrieved from the Internet: URL: http://wftp3.itu.int/av-arch/jctvc-site/2010_04_A_Dresden/JCTVC-A121.zip .
Loeffler, C., et al., "Algorithm-architecture mapping for custom DCT chips." in Proc. Int. Symp. Circuits Syst. (Helsinki, Finland), Jun. 1988, pp. 1953-1956.
Malvar et al., "Low-complexity transform and quantization in H.264/AVC", IEEE Transactions on Circuits and Systems for Video Technology, Jul. 2003, pp. 598-603, vol. 13, No. 7, XP011099252, ISSN: 1051-8215, DOI: 10.1109/TCSVT.2003.814964.
Ohm et al., "Special Section on the Joint Call for Proposals on High Efficiency Video Coding (HEVC) Standardization", IEEE Transactions on Circuits and Systems for Video Technology, Dec. 2010, pp. 1661-1666, vol. 20, No. 12, XP011334854, ISSN: 1051-8215, DOI: 10. 1109/TCSVT.2010.2095692.
Rao, K.R. et al.: "Discrete Cosine Transform Algorithms, Advantages, Applications," Academic Press, Inc., San Diego, CA, 1990, ch 2, pp. 7-25.
Reznik et al., "Efficient fixed-point approximations of the 8×8 Inverse Discrete Cosine Transform", Applications of Digital Image Processing XXX, Sep. 24, 2007, pp. 669617-1-669617-17, vol. 6696, Proceedings of SPIE, XP002489240, ISSN: 0277-786X, DOI: 10.1117/12.740228.
Reznik et al., "Improved precision of fixed-point algorithms by means of common factors", IEEE International Conference on Image Processing (ICIP-2008), Oct. 12-15, 2008, pp. 2344-2347, XP031374509, ISBN: 978-1-4244-1765-0.
Reznik Y A et al: "Design of fast transforms for high-resolution image and video coding", Applications of Digital Image Processing XXXII, Proceedings of SPIE, vol. 7443, Sep. 2, 2009, pp. 744312-1-744312-17, XP55007444.
Reznik Y A et al: "Fast 15×15 transform for image and video coding applications", Data Compression Conference 2009 (DCC '09), Mar. 16-18, 2009, Snowbird, UT, USA, Mar. 16, 2009, p. 465, XP031461157, ISBN: 978-1-4244-3753-5.
Reznik Y A: "On fast algorithm for computing even-length DCT", arXiv: 1001.3713v1 [cs.DS], Jan. 21, 2010, XP55007457, Retrieved from the Internet: URL: http://arxi v.org/PS-cache/arxiv/pdf/1001/1001.3713v1.pdf [retrieved on Sep. 19, 2011].
Reznik Y.A., et al., "On complexity of size 960 transform in AAC family of codecs", ISO/IEC JTC1/SC29/WG11 M16443, Apr. 2009, Maui, HI, USA, Apr. 17, 2009, XP030045040, section 2.
Sullivan G. L., "Standardization of IDCT approximation behavior for video compression: the history and the new MPEG-C parts 1 and 2 standards," Applications of Digital Image Processing, Proceedings of SPIE, 2007, 6696, 669611-1 to 669611-22.
Tan Li et al: "A unified computing kernel for MDCT/IMDCT in modern audio coding standards", Proceedings of International Symposium on Communications and Information Technologies 2007 (ISCIT 07), Oct. 17-19, 2007, Sidney, Australia, Oct. 17, 2007, pp. 546-550, XP031166524, DOI: 10.1109/ISCIT.2007.4392079 ISBN: 978-1-4244-0976-1.
Taiwan Search Report—TW099111842—TIPO—Apr. 25, 2013.
Hong Y.M., et al., "Low-complexity 16x16 and 32x32 transforms and partial frequency transform," JCTVC-C209, Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010, pp. 1-11.
Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.
Bross, et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, pp. 259.
Bross, et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-I1003_d21, pp. 290.
Bross, et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, pp. 261.
Bross et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.
Bross et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.
ITU-T H.264, Series H: Audiovisual and Multimedia Systems, Infrastructure of audiovisual services—Coding of moving video, Advanced video coding for generic audiovisual services, the International Telecommunication Union. Jun. 2011, 674 pp.
Thomas Wiegand et al.," WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010.
Wiegand et al., "WD3: Working Draft 3 of High-Efficiency Video Coding," Document JCTVC-E603, 5th Meeting: Geneva, CH, Mar. 16-23, 2011, 193 pp.
Wiegand T. et al., "WD2: Working Draft 2 of High-Efficiency Video Coding", Jan. 28, 2011, No. JCTVC-D503, Jan. 28, 2011, XP002679642, Retrieved from the Internet: URL: http://wftp3.itu.int/av-arch/jctvc-site/2011_01_D_Daegu/ [retrieved on Jul. 11, 2012].
Rao et al., "Discrete Cosine Transform: Algorithms, Advantages, Applications," Academic Press, San Diego, 1990, 490 pp.
Britanak et al., "Discrete Cosine and Sine Transforms: General Properties, Fast Algorithms and Integer Approximations," Academic Press, 2006.
Cham, "Development of integer cosine transforms by the principle of dyadic symmetry," Communications, Speech and Vision, IEE Proceedings I, vol. 136, No. 4, pp. 276-282, Aug. 1989.
Reznik et al., "Improved Precision of Fixed-Point Algorithms by Means of Common Factors," Proc. ICIP 2008, San Diego, CA.
Reznik et al., "On Design of Transforms for High-Resolution/High-Performance Video Coding," ISO/IEC JTC1/SC29/WG11, MPEG input document M16438, MPEG's 88th meeting, Maui, HI, Apr. 2009, pp. 23.
Feig et al., "On the multiplicative complexity of discrete cosine transforms (Corresp.)," IEEE Trans. Info. Theory, vol. IT-38, pp. 1387-1391, Jul. 1992.
Chan et al., "Direct methods for computing discrete sinusoidal transforms," Proc. IEE, vol. 137, Pt. F, No. 6, pp. 433-442, Dec. 1990.
Kok, "Fast Algorithm for Computing Discrete Cosine Transform," IEEE Trans. Signal Proc., vol. 45, No. 3, pp. 757-760, Mar. 1997.
Heideman, "Computation of an Odd-Length DCT from a Real-Valued DFT of the Same Length," IEEE Trans Signal Proc., vol. 40, No. 1, Jan. 1992.

(56) References Cited

OTHER PUBLICATIONS

Plonka et al., "Fast and numerically stable algorithms for discrete cosine transforms", Linear Algebra and Applications, vol. 394, No. 1, Jan. 2005, pp. 309-345.
Yuriy Reznik, at al., "Fast Algorithms for Computation of 5-Point DCT-II, DCT-IV, and DST-IV, and Architectures," U.S. Appl. No. 12/334,238, filed Dec. 12, 2008.
Yuriy Reznik, et al., "Low-Complexity Transforms for Data Compression and Decompression," U.S. Appl. No. 12/349,406, filed Jan. 6, 2009.
Graps, "An Introduction to Wavelets," IEEE Computational Science and Engineering , Summer 1995, vol. 2, No. 2, 18 pp.
Beaulieu et al., "Multi-Spectral Image Resolution Refinement Using Stationary Wavelet Transform With Marginal and Joint Statistics Modeling," Department de R-D, Centre de Recherche Informatique de Montreal, pp. 9.
Xiong et al., "A Comparative Study of DCT-and Wavelet-Based Image Coding," IEEE Transactions on Circuits and Systems for Video Technology, vol. 9, No. 5, Aug. 1999, pp. 692-695.
Fuldseth A., et al., "Transform design for HEVC with 16 bit intermediate data representation", ITU-T SG16 WP3 and ISO/IEC JTC1/SC29/WG11, Document JCTVC-E243, 5TH JCT-VC Meeting, Mar. 16-23, 2011, Geneva, CH, No. JCTVC-E243, Mar. 18, 2011, pp. 1-16; XP030048334.
Fuldseth A., et al., "Unified transform design for HEVC with 16 bit intermediate data representation", ITU-T SG16 WP3 and ISO/IEC JTC1/SC29/WG11, Document JCTVC-D224, 4TH JCT-VC Meeting, Jan. 20-28, 2011, Daegu, KR, No. JCTVC-D224, Jan. 15, 2011, pp. 1-7; XP030008264, ISSN: 0000-0013.
Joshi, et al., "Efficient 16 and 32-point transforms," Joint Collaborative Team on Video Coding (JCT-VC) of ITU-T SG16 WP3 and ISO 6G16 WP3 and ISO.IEC JTCl/SC29/WG11, 4th Meeting: Daegu, KR, Jan. 20-28, 2011, 8 pp.
Joshi R et al., "CE10: Scaled orthogonal integer transforms supporting recursive factorization structure", 5. JCT-VC Meeting; 96. MPEG Meeting; Mar. 16-23, 2011; Geneva;( Joint Collaborative Team on Video Coding of ISO/IEC JTC1/ SC29/WG11AND ITU-T SG. 16); URL:http://wftp3.1tu.int/av-arch/jc tvc-site/, No. JCTVC-E370, Mar. 11, 2011, 8 pp.; XP030008876, ISSN: 0000-0005 the whole document.
Joshi R., et al., "CE10: Scaled orthogonal integer transforms supporting recursive factorization structure", ITU-T SG16 WP3 and ISO/IEC JTC1/SC29/WG11, Document JCTVC-F352 R1, 6TH JCT-VC Meeting, July 14-22, 2011, Torino, IT, No. JCTVC-F352 R1, Jul. 12, 2011, 12 pp.; XP030049338.
Joshi R., et al., "Recursive factorization for 16 and 32-point transforms using 4 and 8-point HM 3.0 core transforms", ITU-T SG16 WP3 and ISO/IEC JTC1/SC29/WG11, Document JCTVC-F592, 6TH JCT-VC Meeting, Jul. 14-22, 2011, Torino, IT, No. JCTVC-F592, Jul. 18, 2011, 4 pp.; XP030049589.
Reznik, Y.A. et al., "Low-Drift Fixed-Point 8x8 IDCT Approximation with 8-Bit Transform Factors", Image Processing, 2007. ICIP 2007. IEEE International Conference ON, IEEE, PI , Sep. 1, 2007, pp. VI-81, XP031158267, ISBN: 978-1-4244-1436-9 the whole document.
Sadafale M., et al., "Low-complexity configurable transform architecture for HEVC", ITU-T SG16 WP3 and ISO/IEC JTC1/SC29/WG11, Document JCTVC-C226, 3rd JCT-VC Meeting, Oct. 7-15, 2010, Guangzhou, CN, No. JCTVC-C226, Oct. 2, 2010, 4 pp.; XP030007933, ISSN: 0000-0019.

COMPUTING EVEN-SIZED DISCRETE COSINE TRANSFORMS

This application claims the benefit of U.S. Provisional Application No. 61/169,418, filed Apr. 15, 2009, the entire content of which is incorporated herein by reference.

TECHNICAL FIELD

This disclosure relates to data compression and, more particularly, data compression involving transforms.

BACKGROUND

Data compression is widely used in a variety of applications to reduce consumption of data storage space, transmission bandwidth, or both. Example applications of data compression include visible or audible media data coding, such as digital video, image, speech, and audio coding. Digital video coding, for example, is used in wide range of devices, including digital televisions, digital direct broadcast systems, wireless communication devices, personal digital assistants (PDAs), laptop or desktop computers, digital cameras, digital recording devices, video gaming devices, cellular or satellite radio telephones, or the like. Digital video devices implement video compression techniques, such as MPEG-2, MPEG-4, or H.264/MPEG-4 Advanced Video Coding (AVC), to transmit and receive digital video more efficiently.

In general, video compression techniques perform spatial prediction, motion estimation and motion compensation to reduce or remove redundancy inherent in video data. In particular, intra-coding relies on spatial prediction to reduce or remove spatial redundancy in video within a given video frame. Inter-coding relies on temporal prediction to reduce or remove temporal redundancy in video within adjacent frames. For inter-coding, a video encoder performs motion estimation to track the movement of matching video blocks between two or more adjacent frames. Motion estimation generates motion vectors, which indicate the displacement of video blocks relative to corresponding video blocks in one or more reference frames. Motion compensation uses the motion vector to generate a prediction video block from a reference frame. After motion compensation, a residual video block is formed by subtracting the prediction video block from the original video block.

A video encoder then applies a transform followed by quantization and lossless statistical coding processes to further reduce the bit rate of the residual block produced by the video coding process. In some instances, the applied transform comprises a discrete cosine transform (DCT). Typically, the DCT is applied to dyadic sized video blocks, where a dyadic sized video block is any block whose size is a power of two. These DCTs may therefore be referred to as dyadic sized DCTs in that these DCTs are applied to dyadic sized video blocks to produce a dyadic sized matrix of DCT coefficients. Examples of dyadic sized DCTs include 4×4, 8×8 and 16×16 DCTs. The dyadic sized matrix of DCT coefficients produced from applying a dyadic sized DCT to the residual block then undergo quantization and lossless statistical coding processes (commonly known as "entropy coding" processes) to generate a bitstream. Examples of statistical coding processes include context-adaptive variable length coding (CAVLC) or context-adaptive binary arithmetic coding (CABAC). A video decoder receives the encoded bitstream and performs lossless decoding to decompress residual information for each of the blocks. Using the residual information and motion information, the video decoder reconstructs the encoded video.

SUMMARY

In general, this disclosure is directed to techniques for coding data, such as media data, using one or more non-dyadic even-sized discrete cosine transforms (DCTs). A non-dyadic even-sized DCT may comprise a DCT that is applied in a media coder to code media data such as video blocks having a size that is a multiple of two but not a power of two. For example, a non-dyadic even-sized DCT may comprise a 6×6, 10×10, 12×12, or a similar sized DCT that is a multiple of two but not a power of two. The DCT implemented in accordance with the techniques of this disclosure may be efficient in terms of compression efficiency and implementation complexity. Compression efficiency refers to an amount or percentage of data compression that may be achieved during subsequent quantization and application of lossless statistical coding processes. Implementation complexity refers to a number and type of mathematical operations that may be necessary in a media coder to implement a given non-dyadic sized DCT. In some instances, the non-dyadic even-sized DCTs implemented in accordance with the techniques of this disclosure may perform more efficiently than dyadic-sized DCTs both in terms of compression efficiency and implementation complexity.

In one aspect, a method of performing a scaled discrete cosine transform of type II (DCT-II) comprises determining, with an apparatus, whether a size of the scaled DCT-II to perform is a multiple of two and, in response to determining that the size of the scaled DCT-II to perform is a multiple of two, performing, with the apparatus, the scaled DCT-II. Performing the scaled DCT-II includes computing a butterfly that includes cross-additions and cross-subtractions of inputs to the DCT-II, wherein the butterfly includes a first portion that cross-adds a first sub-set of the inputs and a second portion that cross-subtracts a second sub-set of the inputs, reversing an order of the second sub-set of cross-subtracted inputs to generate a reverse-ordered second sub-set of the inputs and computing a series of recursive subtractions that each recursively subtract the reverse-ordered second sub-set of the inputs to generate a recursively subtracted second sub-set of the inputs. Performing the scaled DCT-II also includes computing a scaled sub-DCT-II that receives the first sub-set of the inputs and generates a first set of outputs based on the first sub-set of the inputs, computing a full sub-DCT-III that receives the recursively subtracted second sub-set of the inputs and generates a second set of outputs based on the recursively subtracted second sub-set of the inputs, and reordering the first and second set of outputs produced by the respective scaled sub-DCT-II and full sub-DCT-III to generate scaled output values of the DCT-II.

In another aspect, a media coding device comprises a scaled DCT-II unit that determines whether a size of a scaled DCT-II to perform is a multiple of two, and in response to determining that the size of the scaled DCT-II to perform is a multiple of two, performs the scaled DCT-II. The scaled DCT-II unit includes a butterfly unit that computes a butterfly that includes cross-additions and cross-subtractions of inputs to the DCT-II, wherein the butterfly unit includes a first portion that cross-adds a first sub-set of the inputs and a second portion that cross-subtracts a second sub-set of the inputs, an order reversal unit that reverses an order of the second sub-set of cross-subtracted inputs to generate a reverse-ordered second sub-set of the inputs and a recursive subtraction unit that computes a series of recursive subtractions that each recursively subtract the reverse-ordered second sub-set of the inputs to generate a recursively subtracted second sub-set of the inputs. The scaled DCT-II unit also includes a scaled sub-DCT-II unit that computes a scaled sub-DCT-II that receives the first sub-set of the inputs and generates a first set of outputs based on the first sub-set of the inputs, and a full sub-DCT-III unit that computes a full sub-DCT-III that receives the recursively subtracted second sub-set of the inputs and generates a second set of outputs based on the recursively subtracted second sub-set of the inputs. The scaled DCT-II unit then reorders the first and second set of outputs produced by the respective scaled sub-DCT-II and full sub-DCT-III to generate scaled output values of the DCT-II.

In another aspect, a non-transitory computer-readable medium comprises instructions for causing a processor to determine whether a size of a scaled DCT-II to perform is a multiple of two and, in response to determining that the size of the scaled DCT-II to perform is a multiple of two, perform the scaled DCT-II. The instructions that cause the processor to perform the scaled DCT-II include instructions that cause the processor to compute a butterfly that includes cross-additions and cross-subtractions of inputs to the DCT-II, wherein the butterfly includes a first portion that cross-adds a first sub-set of the inputs and a second portion that cross-subtracts a second sub-set of the inputs, reverse an order of the second sub-set of cross-subtracted inputs to generate a reverse-ordered second sub-set of the inputs, compute a series of recursive subtractions that each recursively subtract the reverse-ordered second sub-set of the inputs to generate a recursively subtracted second sub-set of the inputs, compute a scaled sub-DCT-II that receives the first sub-set of the inputs and generates a first set of outputs based on the first sub-set of the inputs, compute a full sub-DCT-III that receives the recursively subtracted second sub-set of the inputs and generates a second set of outputs based on the recursively subtracted second sub-set of the inputs, and reorder the first and second set of outputs produced by the respective scaled sub-DCT-II and full sub-DCT-III to generate scaled output values of the DCT-II.

In another aspect, an apparatus comprises means for determining whether a size of a scaled DCT-II to perform is a multiple of two, and means for performing, in response to determining that the size of the scaled DCT-II to perform is a multiple of two, the scaled DCT-II. The means for performing the scaled DCT-II includes means for computing a butterfly that includes cross-additions and cross-subtractions of inputs to the DCT-II, wherein the butterfly includes a first portion that cross-adds a first sub-set of the inputs and a second portion that cross-subtracts a second sub-set of the inputs, means for reversing an order of the second sub-set of cross-subtracted inputs to generate a reverse-ordered second sub-set of the inputs, and means for computing a series of recursive subtractions that each recursively subtract the reverse-ordered second sub-set of the inputs to generate a recursively subtracted second sub-set of the inputs. The means for performing the scaled DCT-II also includes means for computing a scaled sub-DCT-II that receives the first sub-set of the inputs and generates a first set of outputs based on the first sub-set of the inputs, means for computing a full sub-DCT-III that receives the recursively subtracted second sub-set of the inputs and generates a second set of outputs based on the recursively subtracted second sub-set of the inputs and means for reordering the first and second set of outputs produced by the respective scaled sub-DCT-II and full sub-DCT-III to generate scaled output values of the DCT-II.

In another aspect, a method of performing a full discrete cosine transform of type II (DCT-II) comprises determining, with an apparatus, whether a size of the full DCT-II to perform is a multiple of two and, in response to determining that the size of the full DCT-II to perform is a multiple of two, performing, with the apparatus, the full DCT-II. Performing the full DCT-II includes computing a butterfly that includes cross-additions and cross-subtractions of inputs to the DCT-II, wherein the butterfly includes a first portion that cross-adds a first sub-set of the inputs and a second portion that cross-subtracts a second sub-set of the inputs, reversing an order of the second sub-set of cross-subtracted inputs to generate a reverse-ordered second sub-set of the inputs, and computing a series of recursive subtractions that each recursively subtract the reverse-ordered second sub-set of the inputs to generate a recursively subtracted second sub-set of the inputs. Performing the full DCT-II also includes computing a full sub-DCT-II that receives the first sub-set of the inputs and generates a first set of outputs based on the first sub-set of the inputs, computing a full sub-DCT-III that receives the recursively subtracted second sub-set of the inputs and generates a second set of outputs based on the recursively subtracted second sub-set of the inputs, multiplying the first set of outputs by one or more scale factors to generated a first full set of outputs, and reordering the first full set of outputs and the second set of outputs to generate output values of the DCT-II.

In another aspect, a media coding device comprises a full DCT-II unit that determines whether a size of a full DCT-II to perform is a multiple of two, and in response to determining that the size of the full DCT-II to perform is a multiple of two, performs the full DCT-II. The full DCT-II includes a butterfly unit that computes a butterfly that includes cross-additions and cross-subtractions of inputs to the DCT-II, wherein the butterfly unit includes a first portion that cross-adds a first sub-set of the inputs and a second portion that cross-subtracts a second sub-set of the inputs, an order reversal unit that reverses an order of the second sub-set of cross-subtracted inputs to generate a reverse-ordered second sub-set of the inputs, and a recursive subtraction unit that computes a series of recursive subtractions that each recursively subtract the reverse-ordered second sub-set of the inputs to generate a recursively subtracted second sub-set of the inputs. The full DCT-II also includes a full sub-DCT-II unit that computes a full sub-DCT-II that receives the first sub-set of the inputs and generates a first set of outputs based on the first sub-set of the inputs, a full sub-DCT-III unit that computes a full sub-DCT-III that receives the recursively subtracted second sub-set of the inputs and generates a second set of outputs based on the recursively subtracted second sub-set of the inputs and a scaling unit that multiples output of sub-DCT-III by one or more scale factors to generate a first full set of outputs. The full DCT-II unit then reorders the first full set of outputs and the second set of outputs to generate output values of the DCT-II.

In another aspect, a non-transitory computer-readable medium comprising instructions for causing a processor to determine whether a size of a full DCT-II to perform is a multiple of two and, in response to determining that the size of the full DCT-II to perform is a multiple of two, perform the full DCT-II. The instructions that cause the processor to perform the full DCT-II include instructions that cause the processor to compute a butterfly that includes cross-additions and cross-subtractions of inputs to the DCT-II, wherein the butterfly includes a first portion that cross-adds a first sub-set of the inputs and a second portion that cross-subtracts a second sub-set of the inputs, reverse an order of the second sub-set of cross-subtracted inputs to generate a reverse-ordered second sub-set of the inputs, compute a series of recursive subtractions that each recursively subtract the reverse-ordered second sub-set of the inputs to generate a recursively subtracted second sub-set of the inputs, compute a full sub-DCT-II that receives the first sub-set of the inputs and generates a first set of outputs based on the first sub-set of the inputs, compute a full sub-DCT-III that receives the recursively subtracted second sub-set of the inputs and generates a second set of outputs based on the recursively subtracted second sub-set of the inputs, multiply the first set of outputs by one or more scale factors to generated a first full set of outputs, and reorder the first full set of outputs and the second set of outputs to generate output values of the DCT-II.

In another aspect, an apparatus comprises means for determining whether a size of a full DCT-II to perform is a multiple of two and, means for performing, in response to determining that the size of the full DCT-II to perform is a multiple of two, the full DCT-II. The means for performing the full DCT-II includes means for computing a butterfly that includes cross-additions and cross-subtractions of inputs to the DCT-II, wherein the butterfly includes a first portion that cross-adds a first sub-set of the inputs and a second portion that cross-subtracts a second sub-set of the inputs, means for reversing an order of the second sub-set of cross-subtracted inputs to generate a reverse-ordered second sub-set of the inputs, and means for computing a series of recursive subtractions that each recursively subtract the reverse-ordered second sub-set of the inputs to generate a recursively subtracted second sub-set of the inputs. The means for performing the full DCT-II also includes means for computing a full sub-DCT-II that receives the first sub-set of the inputs and generates a first set of outputs based on the first sub-set of the inputs, means for computing a full sub-DCT-III that receives the recursively subtracted second sub-set of the inputs and generates a second set of outputs based on the recursively subtracted second sub-set of the inputs, means for multiplying the first set of outputs by one or more scale factors to generated a first full set of outputs, and means for reordering the first full set of outputs and the second set of outputs to generate output values of the DCT-II.

In another aspect, a method of performing a discrete cosine transform of type III (DCT-III) comprises determining, with an apparatus, whether a size of the DCT-III to perform is a multiple of two and, in response to determining that the size of the DCT-III to perform is a multiple of two, performing, with the apparatus, the DCT-III. Performing the DCT-III includes performing an inverse of a DCT of type II (DCT-II), wherein performing the DCT-II includes computing a butterfly that includes cross-additions and cross-subtractions of inputs to the DCT-II, wherein the butterfly includes a first portion that cross-adds a first sub-set of the inputs and a second portion that cross-subtracts a second sub-set of the inputs, reversing an order of the second sub-set of cross-subtracted inputs to generate a reverse-ordered second sub-set of the inputs, and computing a series of recursive subtractions that each recursively subtract the reverse-ordered second sub-set of the inputs to generate a recursively subtracted second sub-set of the inputs. Performing the DCT-II also includes computing a sub-DCT-II that receives the first sub-set of the inputs and generates a first set of outputs based on the first sub-set of the inputs, computing a sub-DCT-III that receives the recursively subtracted second sub-set of the inputs and generates a second set of outputs based on the recursively subtracted second sub-set of the inputs and reordering the first and second set of outputs produced by the respective sub-DCT-II and sub-DCT-III to generate output values of the DCT-II.

In another aspect, a media coding device comprises a DCT-III unit that determines whether a size of a DCT-III to perform is a multiple of two, and in response to determining that the size of the DCT-III to perform is a multiple of two, performs the DCT-III. The DCT-III unit performs an inverse of a DCT of type II (DCT-II) performed by a DCT-II unit. To perform the DCT-II, the DCT-II unit includes a butterfly unit that computes a butterfly that includes cross-additions and cross-subtractions of inputs to the DCT-II, wherein the butterfly unit includes a first portion that cross-adds a first sub-set of the inputs and a second portion that cross-subtracts a second sub-set of the inputs, an order reversal unit that reverses an order of the second sub-set of cross-subtracted inputs to generate a reverse-ordered second sub-set of the inputs, a recursive subtraction unit that computes a series of recursive subtractions that each recursively subtract the reverse-ordered second sub-set of the inputs to generate a recursively subtracted second sub-set of the inputs, a sub-DCT-II unit that computes a sub-DCT-II that receives the first sub-set of the inputs and generates a first set of outputs based on the first sub-set of the inputs, and a sub-DCT-III unit that computes a sub-DCT-III that receives the recursively subtracted second sub-set of the inputs and generates a second set of outputs based on the recursively subtracted second sub-set of the inputs. The DCT-II unit reorders the first and second set of outputs produced by the respective sub-DCT-II and sub-DCT-III to generate scaled output values of the DCT-II.

In another aspect, a non-transitory, computer-readable medium comprising instructions for causing a processor to determine whether a size of the DCT-III to perform is a multiple of two and, in response to determining that the size of the DCT-III to perform is a multiple of two, perform the DCT-III. The instructions cause the processor to perform the DCT-III by performing an inverse of a DCT of type II (DCT-II) performed by computing a butterfly that includes cross-additions and cross-subtractions of inputs to the DCT-II, wherein the butterfly includes a first portion that cross-adds a first sub-set of the inputs and a second portion that cross-subtracts a second sub-set of the inputs, reversing an order of the second sub-set of cross-subtracted inputs to generate a reverse-ordered second sub-set of the inputs, computing a series of recursive subtractions that each recursively subtract the reverse-ordered second sub-set of the inputs to generate a recursively subtracted second sub-set of the inputs, computing a sub-DCT-II that receives the first sub-set of the inputs and generates a first set of outputs based on the first sub-set of the inputs, computing a sub-DCT-III that receives the recursively subtracted second sub-set of the inputs and generates a second set of outputs based on the recursively subtracted second sub-set of the inputs, and reordering the first and second set of outputs produced by the respective sub-DCT-II and sub-DCT-III to generate output values of the DCT-II.

In another aspect, an apparatus comprises means for determining whether a size of a DCT-III to perform is a multiple of two and means for performing, in response to determining that the size of the scaled DCT-II to perform is a multiple of two, the DCT-III. The means for performing the DCT-III includes means for performing an inverse of a DCT-II performed by computing a butterfly that includes cross-additions and cross-subtractions of inputs to the DCT-II, wherein the butterfly includes a first portion that cross-adds a first sub-set of the inputs and a second portion that cross-subtracts a second sub-set of the inputs, reversing an order of the second sub-set of cross-subtracted inputs to generate a reverse-ordered second sub-set of the inputs, computing a series of recursive subtractions that each recursively subtract the reverse-ordered second sub-set of the inputs to generate a recursively subtracted second sub-set of the inputs, computing a sub-DCT-II that receives the first sub-set of the inputs and generates a first set of outputs based on the first sub-set of the inputs, computing a sub-DCT-III that receives the recursively subtracted second sub-set of the inputs and generates a second set of outputs based on the recursively subtracted second sub-set of the inputs and reordering the first and second set of outputs produced by the respective sub-DCT-II and sub-DCT-III to generate output values of the DCT-II.

The details of one or more aspects of the techniques are set forth in the accompanying drawings and the description below. Other features, objects, and advantages of the techniques will be apparent from the description and drawings, and from the claims.

DETAILED DESCRIPTION

Figure 1:
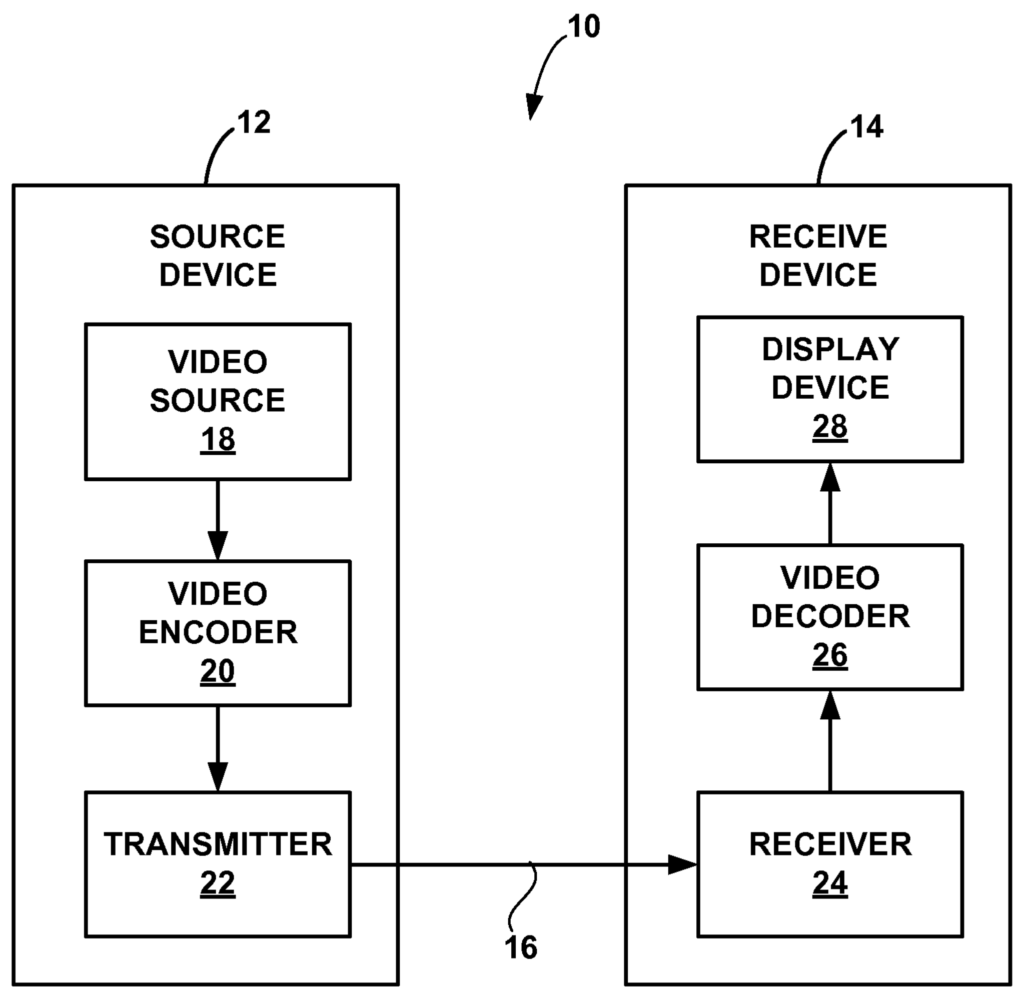
FIG. 1 is a block diagram illustrating a video encoding and decoding system.

In general, this disclosure is directed to techniques for coding data using one or more non-dyadic even-sized discrete cosine transforms (DCTs). The techniques may be applied to compress a variety of data, including visible or audible media data, such as digital video, image, speech, and/or audio data, and thereby transform such electrical signals representing such data into compressed signals for more efficient processing, transmission or archival of the electrical signals. A non-dyadic even-sized DCT comprises a DCT that is applied to video blocks having a size that is a multiple of two but not a power of two. For example, a non-dyadic sized DCT may comprise a 6×6, 6×10, 10×6, 10×10, 10×12, 12×10, 12×12 and any other similar sized DCTs having dimensions that are a multiple of two but not a power of two. As described in greater detail below, these non-dyadic even-sized DCTs may be more efficient in terms of implementation complexity and resulting data compression when compared to dyadic-sized DCTs, such as conventional 4×4, 8×8 and 16×16 sized DCTs traditionally used for compression of audio, speech, image and video data.

The sizes denoted above, whether dyadic or non-dyadic, are represented in terms of discrete data units. To illustrate, video data is often described in terms of video blocks, particularly with respect to video compression. A video block generally refers to any sized portion of a video frame, where a video frame refers to a picture or image in a series of pictures or images. Each video block typically comprise a plurality of discrete pixel data that indicates either color components, e.g., red, blue and green, (so-called "chromaticity" or "chroma" components) or luminosity components (so-called "luma" components). Each set of pixel data comprises a single 1×1 point in the video block and may be considered a discrete data unit with respect to video blocks. Thus, a non-dyadic sized 6×6 video block, for example, comprises six rows of pixels pixel data with six discrete sets of pixel data in each row.

DCTs are commonly described in terms of the size of the block of data, whether audio, speech image or video data, the DCT is capable of processing. For example, if a DCT can process a non-dyadic even-sized 6×6 block of data, the DCT may be referred to as a 6×6 DCT. Moreover, DCTs may be denoted as a particular type. The most commonly employed type of DCT of the eight different types of DCTs is a DCT of type-II, which may be denoted as "DCT-II." Often, when referring generally to a DCT, such reference refers to a DCT of type-II or DCT-II. The inverse of a DCT-II is referred to as a DCT of type-III, which similarly may be denoted as "DCT-III" or, with the common understanding that DCT refers to a DCT-II, as "IDCT" where the "I" in "IDCT" denotes inverse. Reference to DCTs below conforms to this notation, where general reference to DCTs refers to a DCT-II unless otherwise specified. However, to avoid confusion, DCTs, including DCTs-II, are for the most part referred to below with the corresponding type (II, III, etc.) indicated.

The techniques described in this disclosure involve both an encoder and/or decoder that employs an efficient implementation of these non-dyadic sized DCTs-II to facilitate compressing and/or decompression of data. Again, the compression and decompression accomplished using such an algorithm permits physical transformation of electrical signals representing the data such that the signals can be processed, transmitted, and/or stored more efficiently using physical computing hardware, physical transmission media (e.g., copper, optical fiber, wireless, or other media), and/or storage hardware (e.g., magnetic or optical disk or tape, or any of a variety of solid state media). The implementations of the non-dyadic even-sized DCTs are efficient, and potentially optimal, in terms of compression efficiency and implementation complexity. Compression efficiency refers to an amount or percentage of data compression that may be achieved during subsequent quantization and application of lossless statistical coding processes. Implementation complexity refers to a number and type of mathematical operations that may be necessary to implement within a medica coder to achieve a given non-dyadic sized DCT. While described below with respect to video encoders and/or decoders, the techniques may be applied to other media coders and to any form of data suitable for compression using DCTs-II, such as audio, speech or image data.

The implementations of non-dyadic even-sized DCTs-II generally involve a recursive process. The term "recursion" used in this disclosure refers to recursion as known in a computer science context. The term "recursion" in this context suggests that a solution to a problem depends on solutions to smaller instances of the same problem. Most computer programming languages allow recursion by enabling a function to call or invoke itself. The DCT-II implemented in accordance with the techniques of this disclosure may employ recursion to recursively divide larger sized DCTs-II into smaller and smaller sized DCTs-II until at some point the smaller-sized DCTs-II can be solved. To illustrate, to perform a 12×12 DCT-II on a 12×12 block of data, the DCT-II implemented in accordance with the techniques of this disclosure may divide the 12×12 DCT-II into two 6×6 DCTs, one of type II and one of type III. The implementation then calls itself on the 6×6 DCT-II, whereupon the implementation divides the 6×6 DCT-II into two 3×3 DCTs-II. The implementation then computes the 6×6 DCT-III for a portion of the 12×12 block of data, the first 3×3 DCT-II for another portion of the 12×12 block of data and the second 3×3 DCT-II for yet another portion of the 12×12 block of data. By virtue of this recursive process, the DCT-II implementation may be considered a variable-sized DCT-II implementation in that this implementation can compute a DCT-II for any non-dyadic even sized block of data.

In some aspects, the DCT-II implemented in accordance with the techniques of this disclosure may be scaled, which refers to an implementation that does not incorporate certain factors. Considering that these factors are removed, the scaled DCT-II implementation outputs DCT coefficients that do not accurately represent the input data because these DCT coefficients are scaled. Scaled implementations are often favored in coding applications that involve subsequent processes, such as quantization, that can apply the removed factors. As quantization generally involves many multiplications and additions, incorporating these factors into quantization generally does not substantially increase implementation complexity. Consequently, scaled DCT-II implementations are generally favored because these implementations reduce implementation complexity while providing the same coding gain as corresponding full or non-scaled DCT-II implementations. While generally described below with respect to scaled implementations, full DCTs-II may be implemented in accordance with the techniques of this disclosure.

FIG. 1 is a block diagram illustrating a video encoding and decoding system 10. As shown in FIG. 1, system 10 includes a source hardware device 12 that transmits encoded video to a receive hardware device 14 via a communication channel 16. Source device 12 may include a video source 18, video encoder 20 and a transmitter 22. Destination device 14 may include a receiver 24, video decoder 26 and video display device 28.

In the example of FIG. 1, communication channel 16 may comprise any wireless or wired communication medium, such as a radio frequency (RF) spectrum or one or more physical transmission lines, or any combination of wireless and wired media. Channel 16 may form part of a packet-based network, such as a local area network, wide-area network, or a global network such as the Internet. Communication channel 16 generally represents any suitable communication medium, or collection of different communication media, for transmitting video data from source device 12 to receive device 14.

Source device 12 generates video for transmission to destination device 14. In some cases, however, devices 12, 14 may operate in a substantially symmetrical manner. For example, each of devices 12, 14 may include video encoding and decoding components. Hence, system 10 may support one-way or two-way video transmission between video devices 12, 14, e.g., for video streaming, video broadcasting, or video telephony. For other data compression and coding applications, devices 12, 14 could be configured to send and receive, or exchange, other types of data, such as image, speech or audio data, or combinations of two or more of video, image, speech and audio data. Accordingly, discussion of video applications is provided for purposes of illustration and should not be considered limiting of the various aspects of the disclosure as broadly described herein.

Video source 18 may include a video capture device, such as one or more video cameras, a video archive containing previously captured video, or a live video feed from a video content provider. As a further alternative, video source 18 may generate computer graphics-based data as the source video, or a combination of live video and computer-generated video. In some cases, if video source 18 is a camera, source device 12 and receive device 14 may form so-called camera phones or video phones. Hence, in some aspects, source device 12, receive device 14 or both may form a wireless communication device handset, such as a mobile telephone. In each case, the captured, pre-captured or computer-generated video may be encoded by video encoder 20 for transmission from video source device 12 to video decoder 26 of video receive device 14 via transmitter 22, channel 16 and receiver 24. Display device 28 may include any of a variety of display devices such as a liquid crystal display (LCD), plasma display or organic light emitting diode (OLED) display.

Video encoder 20 and video decoder 26 may be configured to support scalable video coding for spatial, temporal and/or signal-to-noise ratio (SNR) scalability. In some aspects, video encoder 20 and video decoder 22 may be configured to support fine granularity SNR scalability (FGS) coding. Encoder 20 and decoder 26 may support various degrees of scalability by supporting encoding, transmission and decoding of a base layer and one or more scalable enhancement layers. For scalable video coding, a base layer carries video data with a minimum level of quality. One or more enhancement layers carry additional bitstream to support higher spatial, temporal and/or SNR levels.

Video encoder 20 and video decoder 26 may operate according to a video compression standard, such as MPEG-2, MPEG-4, ITU-T H.263, or ITU-T H.264/MPEG-4 Advanced Video Coding (AVC). Although not shown in FIG. 1, in some aspects, video encoder 20 and video decoder 26 may be integrated with an audio encoder and decoder, respectively, and include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

In some aspects, for video broadcasting, the techniques described in this disclosure may be applied to enhance H.264 video coding for delivering real-time video services in terrestrial mobile multimedia multicast (TM3) systems using the Forward Link Only (FLO) Air Interface Specification, "Forward Link Only Air Interface Specification for Terrestrial Mobile Multimedia Multicast," published as Technical Standard TIA-1099 (the "FLO Specification"), e.g., via a wireless video broadcast server or wireless communication device handset. The FLO Specification includes examples defining bitstream syntax and semantics and decoding processes suitable for the FLO Air Interface. Alternatively, video may be broadcasted according to other standards such as DVB-H (digital video broadcast-handheld), ISDB-T (integrated services digital broadcast-terrestrial), or DMB (digital media broadcast). Hence, source device 12 may be a mobile wireless terminal, a video streaming server, or a video broadcast server. However, techniques described in this disclosure are not limited to any particular type of broadcast, multicast, or point-to-point system. In the case of broadcast, source device 12 may broadcast several channels of video data to multiple receive device, each of which may be similar to receive device 14 of FIG. 1.

Video encoder 20 and video decoder 26 each may be implemented as one or more microprocessors, digital signal processors (DSPs), application specific integrated circuits (ASICs), field programmable gate arrays (FPGAs), discrete logic, software, hardware, firmware or any combinations thereof. Hence, each of video encoder 20 and video decoder 26 may be implemented as least partially as an integrated circuit (IC) chip or device, and included in one or more encoders or decoders, either of which may be integrated as part of a combined encoder/decoder (CODEC) in a respective mobile device, subscriber device, broadcast device, server, or the like. In addition, source device 12 and receive device 14 each may include appropriate modulation, demodulation, frequency conversion, filtering, and amplifier components for transmission and reception of encoded video, as applicable, including radio frequency (RF) wireless components and antennas sufficient to support wireless communication. For ease of illustration, however, such components are not shown in FIG. 1.

A video sequence includes a series of video frames. Video encoder 20 operates on blocks of pixels within individual video frames in order to encode the video data. The video blocks may have fixed or varying sizes, and may differ in size according to a specified coding standard. Each video frame includes a series of slices. Each slice may include a series of macroblocks, which may be arranged into sub-blocks. As an example, the ITU-T H.264 standard supports intra prediction in various dyadic block sizes, such as 16 by 16, 8 by 8, 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components.

Smaller video blocks can generally provide better resolution, and may be used for locations of a video frame that include higher levels of detail. In general, macroblocks (MBs) and the various sub-blocks may be considered, in general, to represent video blocks. In addition, a slice may be considered to represent a series of video blocks, such as MBs and/or sub-blocks. Each slice may be an independently decodable unit. After prediction, a transform may be performed on dyadic or non-dyadic sized residual blocks, and an additional transform may be applied to the DCT coefficients of the 4×4 blocks for chroma components or luma component if the infra_16×16 prediction mode is used.

Video encoder 20 and/or video decoder 26 of system 10 of FIG. 1 may be configured to include an implementation of a non-dyadic sized DCT-II and an inverse thereof (e.g., a non-dyadic sized DCT-III), respectively, wherein the non-dyadic sized DCT-II is implemented in accordance with the techniques described in this disclosure. While ITU-T H.264 standard supports intra prediction in various dyadic block sizes, such as 16 by 16, 8 by 8, 4 by 4 for luma components, and 8×8 for chroma components, revisions to this standard to improve coding efficiency are currently underway. One revised standard may be referred to as ITU-T H.265 or simply H.265 (sometimes referred to as next generation video coding or NGVC). As described below with respect to FIG. 6, non-dyadic sized DCT of type-II ("DCT-II") may improve coding efficiency while also promoting scaled implementations of these non-dyadic sized DCTs-II having less complexity than similarly dyadic sized DCTs-II. Consequently, ITU-T H.265 and other evolving standards or specifications may consider implementations of non-dyadic sized DCTs-II so as to improve coding efficiency.

In accordance with the techniques described in this disclosure, both scaled and full implementations of non-dyadic sized DCTs-II may employ a recursive process to perform any even-sized DCT-II. The term "recursion" used in this disclosure refers to recursion as known in a computer science context. The term "recursion" in this context suggests that a solution to a problem depends on solutions to smaller instances of the same problem. Most computer programming languages allow recursion by enabling a function to call or invoke itself. With respect to the techniques of this disclosure, the recursive process involves recursive division of even-sized DCT-II to efficiently, if not optimally, compute any even-sized DCT-II.

The DCT-II implemented in accordance with the techniques of this disclosure may employ recursion to recursively divide larger sized DCTs-II into smaller and smaller sized DCTs-II until at some point the smaller-sized DCTs-II can be solved. To illustrate, to perform a 12×12 DCT-II on a 12×12 block of data, the DCT-II implemented in accordance with the techniques of this disclosure may divide the 12×12 DCT-II into two 6×6 DCTs, one of type II and one of type III. The implementation then recurses to compute the 6×6 DCT-II, whereupon the implementation divides the 6×6 DCT-II into two 3×3 DCTs-II. The implementation then computes the 6×6 DCT-III for a portion of the 12×12 block of data, the first 3×3 DCT-II for another portion of the 12×12 block of data and the second 3×3 DCT-II for yet another portion of the 12×12 block of data. By virtue of this recursive process, the DCT-II implementation may be considered a variable-sized DCT-II implementation in that this implementation can compute a DCT-II for any non-dyadic even sized block of data.

In some aspects, the DCT-II implemented in accordance with the techniques of this disclosure may be scaled, which refers to an implementation that does not incorporate certain factors. Considering that these factors are removed, the scaled DCT-II implementation outputs DCT coefficients that do not accurately represent the input data because these DCT coefficients are scaled. Scaled implementations are often favored in coding applications that involve subsequent processes, such as quantization, that can apply the removed factors. As quantization generally involves many multiplications and additions, incorporating these factors into quantization generally does not substantially increase implementation complexity. Consequently, scaled DCT-II implementations are generally favored because these implementations reduce implementation complexity while providing the same coding gain as corresponding full or non-scaled DCT-II implementations. While generally described below with respect to scaled implementations, full DCTs-II may be implemented in accordance with the techniques of this disclosure.

Generally the operations performed by a DCT-II implemented in accordance with the techniques of this disclosure include first determining whether the DCT-II to be performed is of a size that is a multiple of two. In other words, the DCT-II implementation described in this disclosure provides an exit from the recursive iterations by identifying when the DCT-II to be performed is not a multiple of two. If the DCT-II to be performed is not a multiple of two, the recursive iteration ends and the DCT-II to be performed that is not a power of two is computed. In response to the determination that the DCT-II to be performed is of a size that is a multiple of two, the DCT-II implementation first computes a butterfly that includes cross-additions and cross-subtractions of inputs to the DCT-II. The butterfly includes a first portion that cross-adds a first sub-set of the inputs to the DCT-II implementation and a second portion that cross-subtracts a second sub-set of the inputs to the DCT-II implementation.

After computing the butterfly, the DCT-II implementation reverses an order of the second sub-set of cross-subtracted inputs to generate a reverse-ordered second sub-set of the inputs. The DCT-II implementation then computes a series of recursive subtractions that each recursively subtract the reverse-ordered second sub-set of the inputs to generate a recursively subtracted second sub-set of the inputs. Once computed, the DCT-II implementation then computes a scaled sub-DCT-II that receives the first sub-set of the inputs and generates a first set of outputs based on the first sub-set of the inputs. To compute this sub-DCT-II, the DCT-II implementation may recurse, whereupon the DCT-II implementation performs the steps described above to compute the sub-DCT-II.

To illustrate again, the DCT-II implementation may receive a 12×12 block of data representative of residual video data. To perform a 12×12 DCT-II on the 12×12 block of residual video data, the DCT-II implementation may compute a 6×6 DCT-II, which is one example of the sub-DCT-II referred to above. To compute this 6×6 DCT-II, the DCT-II implementation may first determine whether this sub-DCT-II is of a size that is a multiple of two. Given that the 6×6 DCT-II is of a size that is a multiple of two, the DCT-II implementation may perform all of the above computations, reversals and other operations, including computing another sub-DCT-II of size 3×3 that is a sub-DCT-II of the 6×6 DCT-II. Again, the DCT-II implementation may recurse to compute the 3×3 sub-DCT-II, except that in this instances, the DCT-II implementation determines that the 3×3 sub-DCT-II is not of a size that is a multiple of two. As a result of this determination, the DCT-II implementation computes the 3×3 DCT-II directly by referencing a library or other data store that stores matrix coefficients for the 3×3 DCT-II. The DCT-II implementation then returns to a previous recursive iteration and computes a 3×3 DCT-III to compute the 6×6 sub-DCT-II. Again to compute this 3×3 DCT-III, the DCT-II implementation access a library or data store that stores matrix coefficients for the 3×3 DCT-III.

The DCT-II implementation then solves the 6×6 DCT-II by computing both the 3×3 DCT-II and the 3×3 DCT-III, as described below in more detail, and returns to the previous recursive iteration. After returning, the DCT-II implementation computes a full sub-DCT-III of size 6×6 that receives the recursively subtracted second sub-set of the inputs and generates a second set of outputs based on the recursively subtracted second sub-set of the inputs. Again, the DCT-II implementation may solve this 6×6 DCT-III by accessing a library or other data store that stores matrix coefficients for the 6×6 DCT-III. The DCT-II implementation then reorders the first and second set of outputs produced by the respective scaled sub-DCT-II and full sub-DCT-III to generate scaled output values of the DCT-II.

While described in this disclosure with respect to a particular form of transform, e.g., the DCT, the techniques may be applied to produce other even-sized implementations of transforms that are capable of transforming data from the spatial domain to the frequency domain. In some instances, however, the techniques may only be applied to transforms that do not take location into consideration. That is, the techniques may not apply to transforms that are localized in space, such as wavelet transforms. Moreover, while described with respect to non-dyadic sized DCT-II, the DCT-II implemented in accordance with the techniques of this disclosure may also be applied to both dyadic and non-dyadic sized transforms given that these transforms are of an even size so as to permit the above recursive process.

Figure 2:
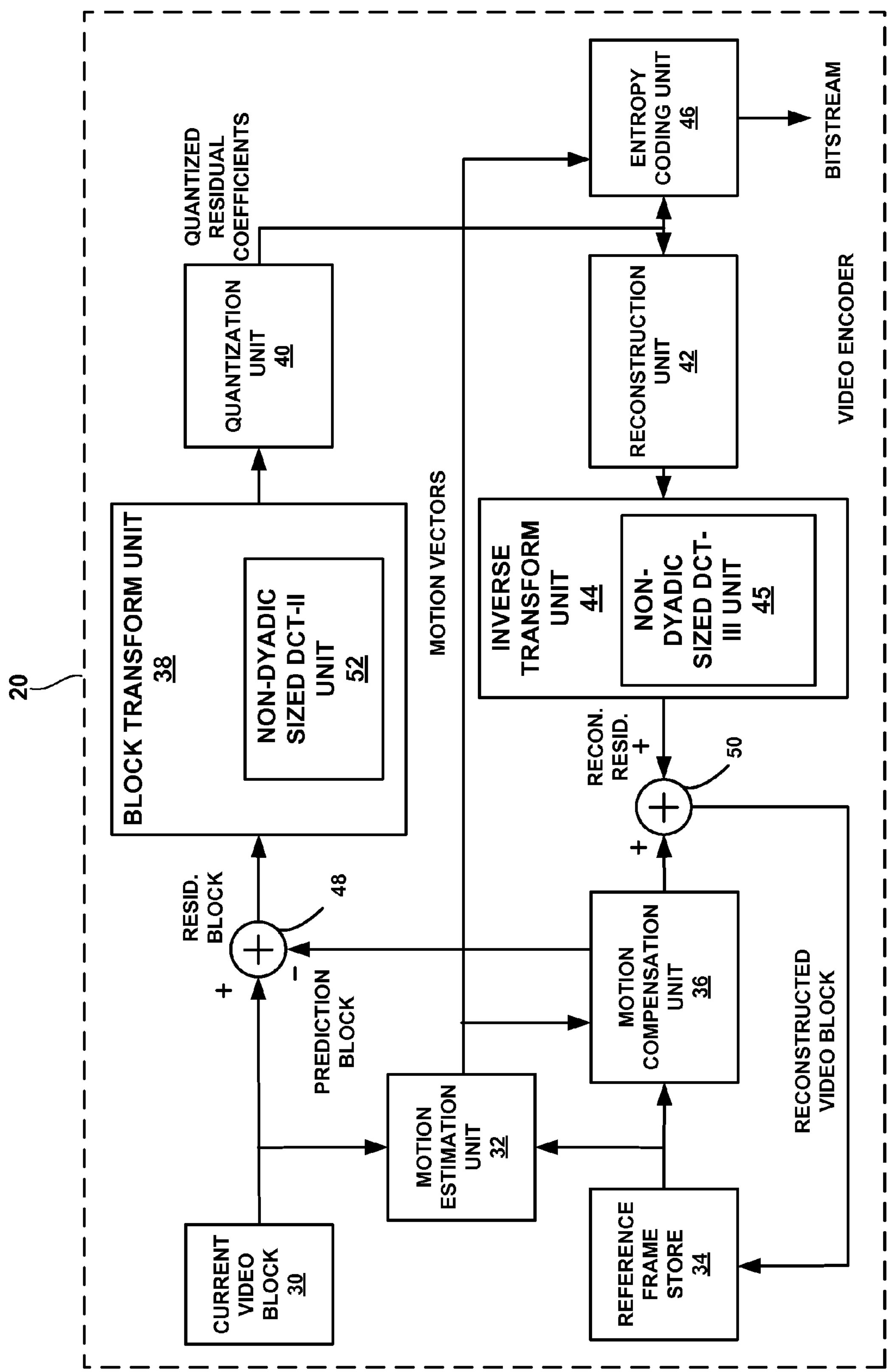
FIG. 2 is a block diagram illustrating an example of a video encoder as shown in FIG. 1.

FIG. 2 is a block diagram illustrating an example of a video encoder 20 as shown in FIG. 1. Video encoder 20 may be formed at least in part as one or more integrated circuit devices, which may be referred to collectively as an integrated circuit device. In some aspects, video encoder 20 may form part of a wireless communication device handset or broadcast server. Video encoder 20 may perform intra- and inter-coding of blocks within video frames. Intra-coding relies on spatial prediction to reduce or remove spatial redundancy in video within a given video frame. Inter-coding relies on temporal prediction to reduce or remove temporal redundancy in video within adjacent frames of a video sequence. For inter-coding, video encoder 20 performs motion estimation to track the movement of matching video blocks between adjacent frames.

As shown in FIG. 2, video encoder 20 receives a current video block 30 within a video frame to be encoded. In the example of FIG. 2, video encoder 20 includes motion estimation unit 32, reference frame store 34, motion compensation unit 36, block transform unit 38, quantization unit 40, inverse quantization unit 42, inverse transform unit 44 and entropy coding unit 46. An in-loop or post loop deblocking filter (not shown) may be applied to filter blocks to remove blocking artifacts. Video encoder 20 also includes summer 48 and summer 50. FIG. 2 illustrates the temporal prediction components of video encoder 20 for inter-coding of video blocks. Although not shown in FIG. 2 for ease of illustration, video encoder 20 also may include spatial prediction components for intra-coding of some video blocks.

Motion estimation unit 32 compares video block 30 to blocks in one or more adjacent video frames to generate one or more motion vectors. The adjacent frame or frames may be retrieved from reference frame store 34, which may comprise any type of memory or data storage device to store video blocks reconstructed from previously encoded blocks. Motion estimation may be performed for blocks of variable sizes, e.g., 16×16, 16×8, 8×16, 8×8 or smaller block sizes, as well as, non-dyadic sizes, such as 6×6, 10×10 and 12×12. Motion estimation unit 32 identifies one or more blocks in adjacent frames that most closely matches the current video block 30, e.g., based on a rate distortion model, and determines displacement between the blocks in adjacent frames and the current video block. On this basis, motion estimation unit 32 produces one or more motion vectors (MV) that indicate the magnitude and trajectory of the displacement between current video block 30 and one or more matching blocks from the reference frames used to code current video block 30. The matching block or blocks will serve as predictive (or prediction) blocks for inter-coding of the block to be coded.

Motion vectors may have half- or quarter-pixel precision, or even finer precision, allowing video encoder 20 to track motion with higher precision than integer pixel locations and obtain a better prediction block. When motion vectors with fractional pixel values are used, interpolation operations are carried out in motion compensation unit 36. Motion estimation unit 32 identifies the best block partitions and motion vector or motion vectors for a video block using certain criteria, such as a rate-distortion model. For example, there may be more than motion vector in the case of bi-directional prediction. Using the resulting block partitions and motion vectors, motion compensation unit 36 forms a prediction video block.

Video encoder 20 forms a residual video block by subtracting the prediction video block produced by motion compensation unit 36 from the original, current video block 30 at summer 48. Block transform unit 38 applies a transform producing residual transform block coefficients. As shown in FIG. 2, block transform unit 38 includes at least one non-dyadic sized DCT-II unit 52 generated in accordance with the techniques described in this disclosure. Non-dyadic sized DCT-II unit 52 may represent either scaled or full DCT as shown below. DCT-II unit 52 represents a hardware or combination hardware and software (such as a digital signal processor or DSP executing software code or instructions) module that implements the techniques described in this disclosure. Block transform unit 38 applies non-dyadic sized DCT-II unit 52 to the residual block to produce a non-dyadic sized block of residual transform coefficients. DCT-II unit 52 generally transforms the residual block from the spatial domain, which is represented as residual pixel data, to the frequency domain, which is represented as DCT coefficients. The transform coefficients may comprise DCT coefficients that include at least one DC coefficient and one or more AC coefficients.

DCT-II unit 52 performs the techniques of this disclosure to process any even-sized block of residual data, including both dyadic and non-dyadic sized blocks of residual data. As described in more detail below, DCT-II unit 52 may implement a recursive processes to compute the DCT-II whereby the DCT-II for a large block of residual data, such as a 20×20 block of residual data, may be computed by manipulating the 20×20 block of data to produce two 10×10 blocks of data that can be processed using a 10×10 DCT-II and a 10×10 DCT-III. DCT-II unit 52 then computes the 10×10 DCT-II in the same manner that it solves the 20×20 DCT-II. That is, DCT-II unit 52 manipulates the 10×10 block of data to produce two 5×5 blocks of data that can be processed using a 5×5 DCT-II and a 5×5 DCT-III. Since odd-sized DCTs-II cannot be divided any further, DCT-II unit 52 computes the 5×5 DCT-II for the 5×5 block of data directly without recursing any further. DCT-II unit 52 returns from this recursive iteration with the directly computed result of the 5×5 DCT-II and computes directly the result of the 5×5 DCT-III when applied to the other 5×5 block of data. DCT-II unit 52 reorders the result determined by DCT-III and then returns from this recursive iteration. Upon returning to the previous iteration, DCT-II unit 52 directly computes a 10×10 DCT-III for the other 10×10 block of residual data and reorders the result of computing the 10×10 DCT-III. DCT-II unit 52 then outputs the result from computing the 10×10 DCT-II and the reordered result of computing the 10×10 DCT-III as a 20×20 block of DCT coefficients.

Quantization unit 40 quantizes (e.g., rounds) the residual transform block coefficients to further reduce bit rate. As mentioned above, quantization unit 40, in some instances, accounts for the scaled nature of scaled even-sized DCT-II unit 52 by incorporating factors not accounted for in the implementation of DCT-II by scaled DCT-II unit 52. As quantization typically involves multiplication, incorporating these factors into quantization unit 40 may not increase the implementation complexity of quantization unit 40. In this respect, scaled non-dyadic even-sized DCT-II unit 52 decreases the implementation complexity of DCT-II unit 52 without increasing the implementation complexity of quantization unit 40, resulting in a net decrease of implementation complexity with respect to video encoder 20.

Entropy coding unit 46 entropy codes the quantized coefficients to even further reduce bit rate. Entropy coding unit 46 performs a statistical lossless coding, referred to in some instances, as entropy coding. Entropy coding unit 46 models a probability distribution of quantized DCT coefficients and selects a codebook (e.g., CAVLC or CABAC) based on the modeled probability distribution. Using this codebook, entropy coding unit 46 selects codes for each quantized DCT coefficient in a manner that compresses quantized DCT coefficients. To illustrate, entropy coding unit 46 may select a short codeword (in terms of bits) for frequently occurring quantized DCT coefficients and longer codeword (in term of bits) for less frequently occurring quantized DCT coefficients. So long as the short codeword uses less bits than the quantized DCT coefficients, on average entropy coding unit 46 compresses the quantized DCT coefficients. Entropy coding unit 46 outputs the entropy coded coefficients as a bitstream which is sent to video decoder 26. In general, video decoder 26 performs inverse operations to decode and reconstruct the encoded video from the bitstream, as will be described with reference to the example of FIG. 3.

Reconstruction unit 42 and inverse transform unit 44 reconstruct quantized coefficients and apply inverse transformation, respectively, to reconstruct the residual block. Inverse transform unit 44 includes an inverse version of non-dyadic DCT-II unit 52 that implements an inverse DCT-II (which is also referred to as a DCT-III) in accordance with the techniques described in this disclosure. This inverse version is shown in the example of FIG. 1 as non-dyadic sized DCT-III unit 45, which may be substantially similar to non-dyadic sized DCT-III unit 68 described below with respect to FIG. 3. Summation unit 50 adds the reconstructed residual block to the motion compensated prediction block produced by motion compensation unit 36 to produce a reconstructed video block for storage in reference frame store 34. The reconstructed video block is used by motion estimation unit 32 and motion compensation unit 36 to encode a block in a subsequent video frame.

Figure 3:
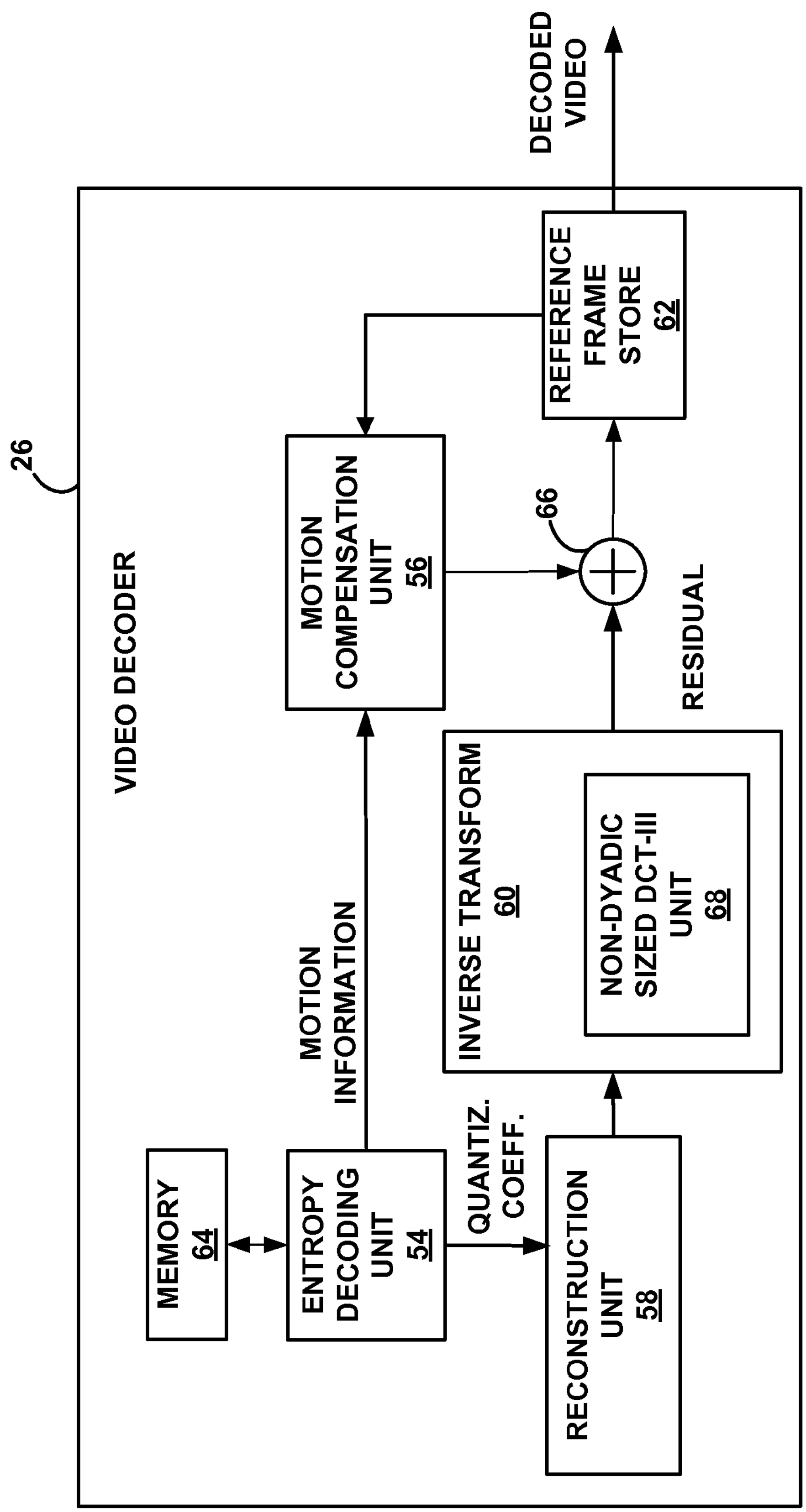
FIG. 3 is a block diagram illustrating an example of a video decoder of FIG. 1.

FIG. 3 is a block diagram illustrating an example of video decoder 26 of FIG. 1. Video decoder 26 may be formed at least in part as one or more integrated circuit devices, which may be referred to collectively as an integrated circuit device. In some aspects, video decoder 26 may form part of a wireless communication device handset. Video decoder 26 may perform intra- and inter-decoding of blocks within video frames. As shown in FIG. 3, video decoder 26 receives an encoded video bitstream that has been encoded by video encoder 20. In the example of FIG. 3, video decoder 26 includes entropy decoding unit 54, motion compensation unit 56, reconstruction unit 58, inverse transform unit 60, and reference frame store 62. Entropy decoding unit 64 may access one or more data structures stored in a memory 64 to obtain data useful in coding. Video decoder 26 also may include an in-loop deblocking filter (not shown) that filters the output of summer 66. Video decoder 26 also includes summer 66. FIG. 3 illustrates the temporal prediction components of video decoder 26 for inter-decoding of video blocks. Although not shown in FIG. 3, video decoder 26 also may include spatial prediction components for intra-decoding of some video blocks.

Entropy decoding unit 54 receives the encoded video bitstream and decodes from the bitstream quantized residual coefficients and quantized parameters, as well as other information, such as macroblock coding mode and motion information, which may include motion vectors and block partitions. Motion compensation unit 56 receives the motion vectors and block partitions and one or more reconstructed reference frames from reference frame store 62 to produce a prediction video block.

Reconstruction unit 58 inverse quantizes, i.e., de-quantizes, the quantized block coefficients. Inverse transform unit

60 applies an inverse transform, e.g., an inverse DCT, to the coefficients to produce residual blocks. More specifically, inverse transform unit 60 includes a non-dyadic sized DCT-III unit 68, which inverse transform unit 60 applies to the coefficients to produce residual blocks. Non-dyadic sized DCT-III 68 represents either a scaled or full DCT-III implementation. Non-dyadic sized DCT-III unit 68, which is the inverse of non-dyadic sized DCT-II unit 52 shown in FIG. 2, may transform the coefficients from the frequency domain to the spatial domain to produce the residual blocks. Similar to quantization unit 40 above, reconstruction unit 58, in some instances, accounts for the scaled nature of DCT-III unit 68 by incorporating factors into the reconstruction process with little if any increase in implementation complexity. Computing the scaled non-dyadic sized DCT-III so that it does not include these factors may reduce implementation complexity, thereby resulting in a net decrease of complexity for video decoder 26.

The prediction video blocks are then summed by summer 66 with the residual blocks to form decoded blocks. A deblocking filter (not shown) may be applied to filter the decoded blocks to remove blocking artifacts. The filtered blocks are then placed in reference frame store 62, which provides reference frame for decoding of subsequent video frames and also produces decoded video to drive display device 28 (FIG. 1).

Figure 4:
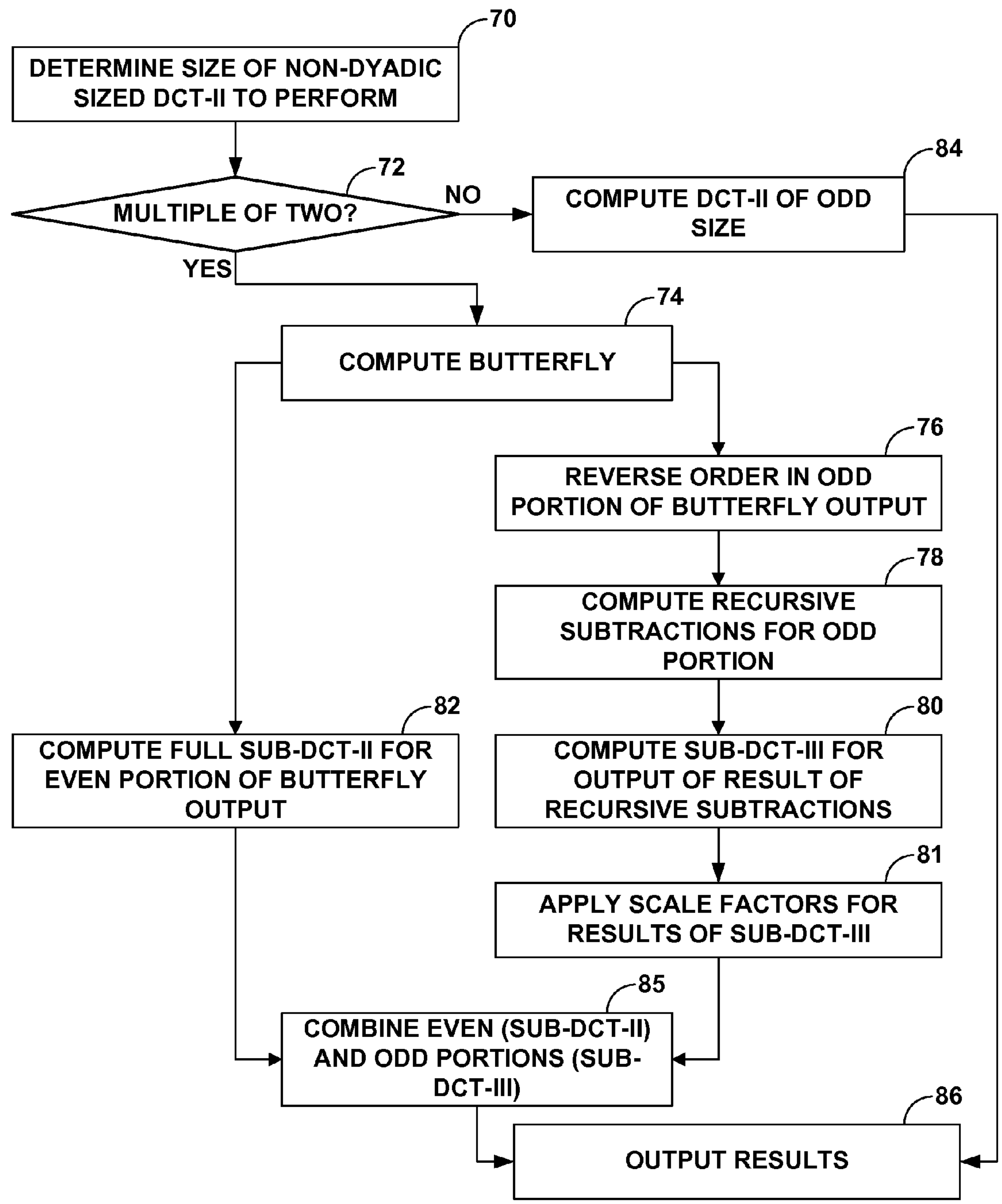
FIG. 4 is a flowchart illustrating an example recursive iteration performed by a non-dyadic sized DCT-II unit implemented in accordance with the techniques described in this disclosure.

FIG. 4 is a flowchart illustrating an example recursive iteration performed by a non-dyadic sized DCT-II unit, such as non-dyadic sized DCT-II unit 52 shown in the example of FIG. 2, implemented in accordance with the techniques described in this disclosure. The recursive algorithm or process may be implemented as a plurality of instructions, such as a computer program, stored on a computer-readable storage medium that cause a processor to carry out the algorithm described in this disclosure. Alternatively, dedicated hardware, such as field programmable gate array (FPGA), an application specific integrated circuit (ASIC), or any other type of similar hardware may implement the techniques of this disclosure so as to perform a DCT-II of any given non-dyadic or even size using the recursive iteration demonstrated with respect to the example of FIG. 4. The techniques should not be limited to any particular implementation of the recursive algorithm.

Initially, DCT-II unit 52 determines a size of a non-dyadic DCT-II to perform (70). Usually, DCT-II unit 52 bases this determination on a size of a block of residual data that DCT-II unit 52 receives. If it is determined that the size of the residual block of data is a multiple of two ("YES" 72), DCT-II unit 52 computes a butterfly that includes cross-additions and cross-subtractions of inputs values to DCT-II unit 52 (74), where the input values may include residual block values in the example of a video encoder. The butterfly generally includes an even portion that cross-subtracts and/or cross-adds a first sub-set of the inputs, which may be referred to as the even inputs, and a odd portion that cross-subtracts and/or cross-adds a second sub-set of the inputs, which may be referred to as the odd inputs. DCT-II unit 52 then reverses the order of the odd inputs for the odd portion of the non-dyadic sized DCT-II (76), as shown in the example of FIG. 5B below. DCT-II unit 52, also in accordance with the recursive techniques of this disclosure, computes a series of recursive subtractions for the odd portion of the implementation, which again is shown below with respect to the example of FIG. 5B (78). DCT-II unit 52 then directly computes sub-DCT-III of a size one half that of the size of the DCT-II to perform using the result of the recursive subtractions as inputs (80). DCT-II unit 52 then applies scale factors to the results of computing the sub-DCT-III (81).

Meanwhile, either before, after or concurrently with reversing the order of the odd portion, computing the recursive subtractions and computing sub-DCT-III, DCT-II unit 52 computes a full sub-DCT-II of a size half that of the determined size of the DCT-II to perform for the even portion of the butterfly output (82). To compute this sub-DCT-II for the even portion of the butterfly output, DCT-II unit 52 generally performs another recursive iteration whereby the sub-DCT-II of the size half that of the determined size of the DCT-II to perform undergoes steps 70-82 described above. This recursive iteration repeats until one of the sub-DCT-IIs is an odd size, whereupon DCT-II unit 52 determines the size of this sub-DCT-II is not a multiple of two ("NO" 72) and directly computes the sub-DCT-II of the odd size (84). The term "directly compute" as used herein refers to a process of accessing a library or data store that stores the matrix coefficients used to determine a DCT-II or DCT-III of a particular size. DCT-II unit 52, after computing the sub-DCT-II and sub-DCT-III combines the results from the even (sub-DCT-II) and odd portions (sub-DCT-III) (85).

In any event, after computing either a full sub-DCT-II of an even size or odd size or after computing the sub-DCT-III, the recursive iteration ends by outputting the result as DCT coefficients (86). The output results may be stored considering that returning from a single recursive iteration may result in returning to a previous recursive iteration, whereupon more results are output once that recursive iteration finishes and so on until all of the result are output as DCT coefficients. In this respect, the techniques may provide for a DCT-II implementation that is capable of performing a DCT-II for any sized input block of data while also promoting decreased implementation complexity and increased coding efficiency, especially when considering DCTs-II of non-dyadic sizes, relative to convention dyadic-sized DCTs-II.

Figure 5A:
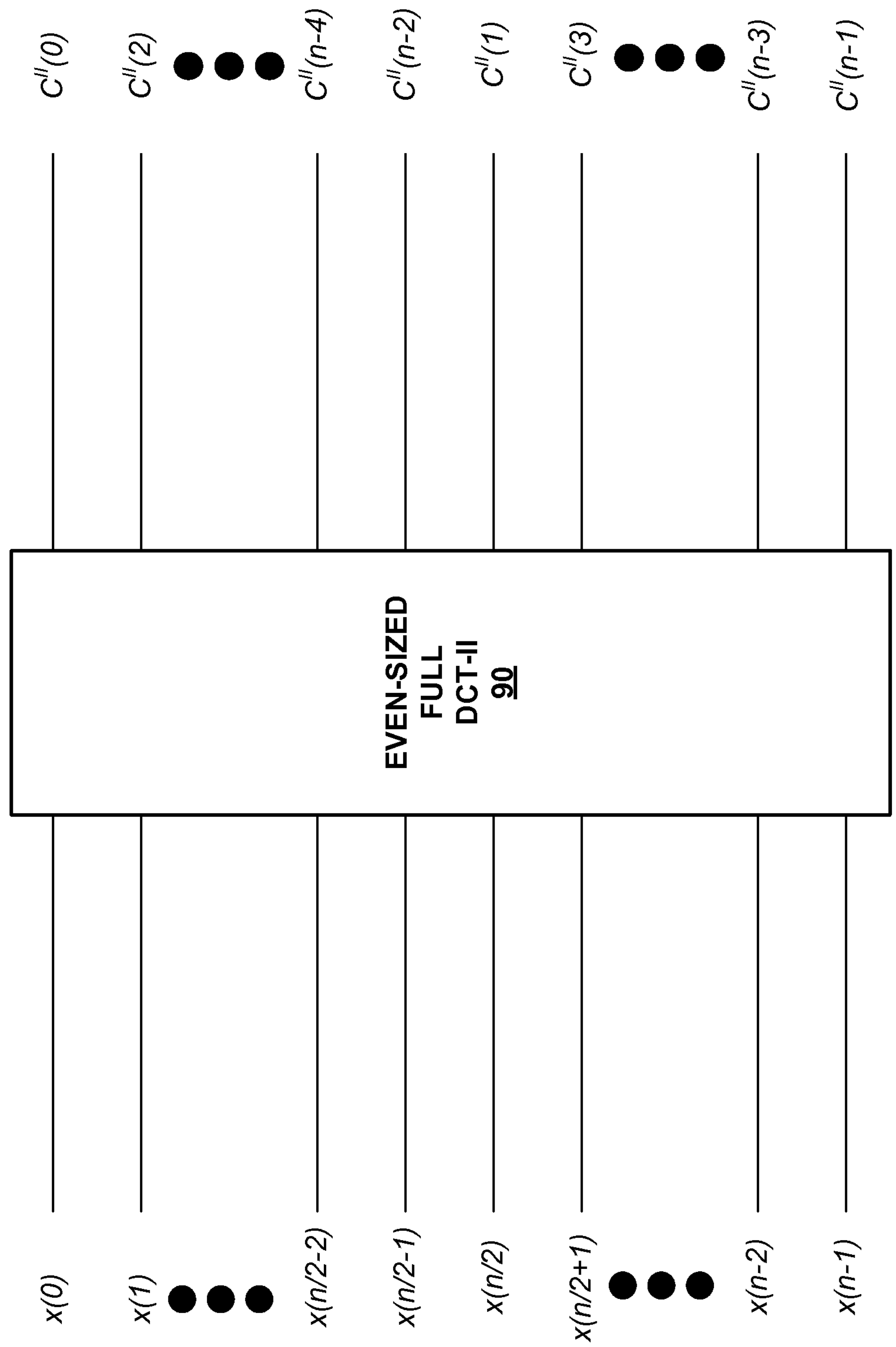
FIGS. 5A-5B are block diagrams illustrating an iteration of the recursive techniques described in this disclosure to perform an even-sized full DCT-II of size n.
Figure 5B:
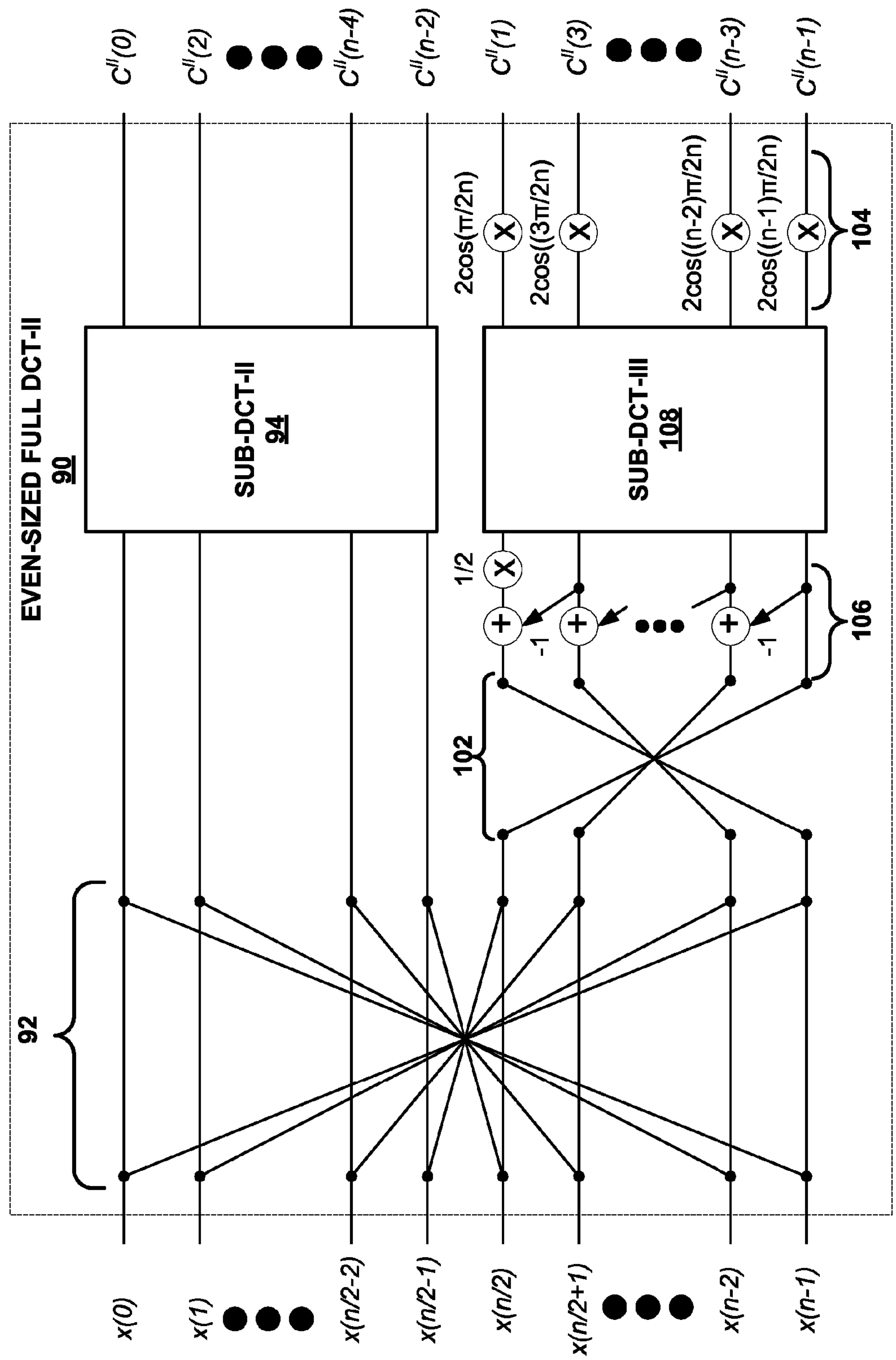

FIGS. 5A-5B are block diagrams illustrating an iteration of the recursive techniques described in this disclosure to perform an even-sized full DCT-II 90 of size n. FIG. 5A is a block diagram illustrating DCT-II 90 of size n, wherein n is assumed to be a multiple of two. As shown in the example of FIG. 5A, even-sized full DCT-II 90 receives n inputs denoted x(0), . . . , x(n−1) and determines n DCT-II coefficients denoted $C^{II}(\mathbf{0}), \ldots, C^{II}(n-1)$. As described above, the recursive techniques of this disclosure implemented by DCT-II unit 52 initially determines a size of DCT-II 90 to perform. With respect to the example of even-sized DCT-II 90, DCT-II unit 52 receives a n×n block of residual data and determines that it needs to perform an n-sized DCT-II, which is represented by even-sized DCT-II 90.

FIG. 5B is a block diagram illustrating operations by DCT-II unit 52 to perform DCT-II 90 in accordance with a first iteration of the recursive techniques described in this disclosure. DCT-II unit 52, upon determining that n is a multiple of two, computes butterfly 92 in the manner described above. DCT-II unit 52 also computes sub-DCT-II 94 and sub-DCT-III 100, again in the manner described above. DCT-II unit 52 directs a first set of values output by butterfly 92 to sub-DCT-II 94 and a second set of values output by butterfly 92 to sub-DCT-III 100. The first set of values may represent the even butterfly cross-added and/or cross-subtracted input values x(0), x(2), . . . , x(n−2), while the second set of values may represent the odd butterfly cross-added and/or cross subtracted input values x(1), x(3), . . . , x(n−1). DCT-II unit 52 then determines the order reversal so that the order of these odd input values is reversed. The order reversal is shown as an order reversal unit 102. DCT-II unit 52 next computes recursive subtractions in the manner demonstrated by recursive subtraction unit 106 that performs recursive subtractions on the odd order reversed input values. DCT-II unit 52 then computes a n/2-point sub-DCT-III in the manner described above, which is represented by sub-DCT-III 108 in the example of FIG. 5B. Sub-DCT-III 108 outputs odd output values that are multiplied by factors 104.

DCT-II unit 92 computes n/2-point sub-DCT-II 94 through another recursive iteration assuming that the size of sub-DCT-II 94 or n/2 is a multiple of two. If determined to be a multiple of two, DCT-II unit 52 uses sub-DCT-II in place of non-dyadic sized DCT-II 90 in the example of FIG. 5B, whereupon DCT-II unit 52 repreats the steps illustrated above with respect to non-dyadic sized DCT-II 90 to compute sub-DCT-II 94. These recursive iterations continue until DCT-II unit 92 determines that one of the subsequent sub-DCTs-II are not of a size that is a multiple of two, as described above.

To illustrate how this algorithm for performing DCTs-II of any given even size may be derived mathematically consider the following equations. First, a DCT of type II and the inverse DCT-II may be defined by the following equations (1), respectively:

$$X_k^{II} = \sqrt{\frac{2}{N}}\,\lambda(k)\sum_{n=0}^{N-1} x_n \cos\left(\frac{(2n+1)k\pi}{2N}\right),\quad k = 0, 1, \ldots, N-1,$$
$$x_n = \sqrt{\frac{2}{N}}\sum_{k=0}^{N-1} X_k^{II}\lambda(k)\cos\left(\frac{(2n+1)k\pi}{2N}\right),\quad n = 0, 1, \ldots, N-1, \tag{1}$$

Here, normalization factors $\lambda(k)=1/\sqrt{2}$, if k=0, otherwise $\lambda(k)=1$.

Also, DCT of type IV and its inverse may be mathematically defined by the following equations (2), respectively:

$$X_k^{IV} = \sqrt{\frac{2}{N}}\sum_{n=0}^{N-1} x_n \cos\left(\frac{\pi}{4N}(2n+1)(2k+1)\right),\quad k = 0, 1, \ldots, N-1,$$
$$x_k = \sqrt{\frac{2}{N}}\sum_{n=0}^{N-1} X_k^{IV}\cos\left(\frac{\pi}{4N}(2n+1)(2k+1)\right),\quad n = 0, 1, \ldots, N-1. \tag{2}$$

Decimation of DCT-II into sub-DCT-II and sub-DCT-IV is based on the following equation (3), which shows that an even-sized DCT-II matrix (with omitted normalization factors) is factorable into a product containing direct sum of sub-DCT-II and sub-DCT-IV matrices:

$$C_N^{II} = P_N\begin{pmatrix} C_{N/2}^{II} & 0 \\ 0 & C_{N/2}^{IV}J_{N/2}\end{pmatrix}\begin{pmatrix} I_{N/2} & J_{N/2} \\ J_{N/2} & -I_{N/2}\end{pmatrix}, \tag{3}$$

where $P_N$ is a permutation matrix producing the following reordering:

$$x'_i = x_{2i},\ x'_{N/2+i} = x_{2i+1},\ i=0, 1, \ldots, N/2-1.$$

Notably, $I_{N/2}$ and $J_{N/2}$ denote N/2×N/2 identity and order reversal matrices correspondingly.

Division of the DCT-II of an even size to perform proceeds in accordance with equation (3), where the sub-DCT-II resulting from the division may be represented by the above equation (1) and the sub-DCT-IV resulting from the division may be represented by the above equation (2). Next, a substitution of the sub-DCT-IV with an equal sub-DCT-III may be performed, where the substitution is based on particular properties of these various types of DCTs. Considering first DCTs of type III, these DCTs-III have the property of being an inverse (or transpose) of a DCT-II, which is set forth mathematically by the following equation (4):

$$C_N^{III} = (C_N^{II})^T = (C_N^{II})^{-1}. \tag{4}$$

Considering next DCTs of type IV, DCTs-IV have the property of being involutory (or self-inverse/self-transpose), which is set forth mathematically by the following equation (5):

$$C_N^{IV} = (C_N^{IV})^T = (C_N^{IV})^{-1}. \tag{5}$$

Moreover, DCTs-IV can be reduced to a DCT-II using the reduction set forth by the following equation (6):

$$C_N^{IV} = R_N C_N^{II} D_N. \tag{6}$$

$R_N$ of equation (6) is a matrix of recursive subtractions, as represented by the following equation (7):

$$R_N = \begin{pmatrix} \frac{1}{2} & 0 & 0 & \ldots & 0 \\ -\frac{1}{2} & 1 & 0 & \ldots & 0 \\ \frac{1}{2} & -1 & 1 & \ldots & 0 \\ -\frac{1}{2} & 1 & -1 & \ldots & 0 \\ \vdots & \vdots & \vdots & \ddots & \vdots \\ -\frac{1}{2} & 1 & -1 & \ldots & 1 \end{pmatrix}, \tag{7}$$

and $D_N$ is a diagonal matrix of factors, as represented by the following equation (8):

$$D_N = \mathrm{diag}\left(2\cos\left(\frac{\pi}{4N}\right), 2\cos\left(\frac{3\pi}{4N}\right), \ldots, 2\cos\left(\frac{(N+1)\pi}{4N}\right)\right). \tag{8}$$

Implementing sub-DCT-IV in accordance with equation (6) results in the factors set forth in equation (8) being applied to the inputs to sub-DCT-IV, which does not enable factorization.

To overcome the issue of factorizing the sub-DCT-IV and thereby reduce implementation complexity, the DCT-II ($C_N^{II}$) of equation (6) can be substituted with a DCT-III using the property of DCT-III represented by equation (4). This substitution may be represented mathematically by the following equation (9):

$$C_N^{IV} = (R_N C_N^{II} D_N)^T = D_N (C_N^{II})^T R_N^T = D_N C_N^{III} R_N^T. \tag{9}$$

In equation (9), the order of $D_N$ and $R_N$ have been switched or reversed with respect to the order of these same matrixes in equation (6) by virtue of substituting the DCT-III for the DCT-II. Due to this reversal, the factors of equation (8) are now applied to outputs of the DCT-III, which enables factorization of the implementation of the DCT-IV, as shown with respect to FIG. 8 below.

Figure 6:
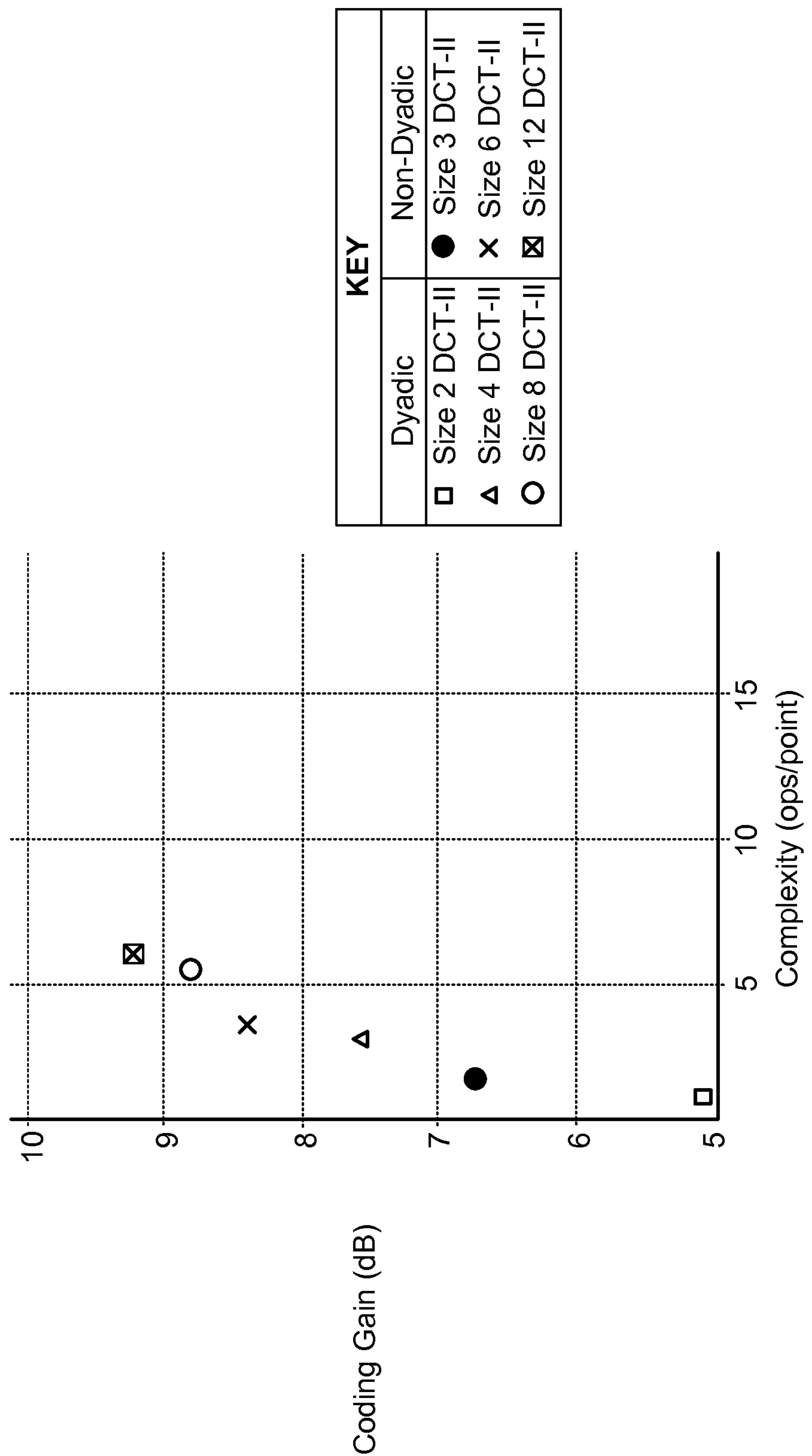
FIG. 6 is a diagram illustrating a graph of coding gain with respect to implementation complexity for efficient implementations of both dyadic and non-dyadic sized DCTs-II.

FIG. 6 is a diagram illustrating a graph 110 of coding gain with respect to implementation complexity for efficient implementations of both dyadic and non-dyadic sized DCTs-II. The efficient implementations for both dyadic and non-dyadic sized DCTs-II are derived using the recursive algorithm set forth in this disclosure. The y-axis of graph 110 denotes coding gain in decibels (dB). The x-axis of graph 110 denotes implementation complexity in terms of operations per point, where a point denotes a data sample of a corresponding dyadic or non-dyadic size.

Coding gain may be defined in terms of the following mathematical equation (9.5):

$$C_g = 10\log_{10}\frac{\frac{1}{N}\sum_{i=0}^{N-1}\sigma_{x_i}^2}{\left(\prod_{i=0}^{N-1}\sigma_{x_i}^2\|f_i\|^2\right)^{1/N}}[\text{dB}], \tag{9.5}$$

where $\sigma_{x_i}^{\ 2}$ denotes variance of i-th transform coefficient (that is i-th diagonal element in matrix), and $\|f_i\mu^2$ denotes the L2-norm of i-th basis function of the transform matrix (which turns to 1 for transforms with orthonormal bases). In essence, this coding gain metric provides what would be the reduction of mean square error (MSE) due to transform coding under sufficiently high rates.

In any event, as coding gain and implementation complexity may vary for various reasons due, for example, to input data type and/or implementation of multiplications, the coding gain and complexity are calculated under various assumptions. First, the complexity calculation assumes that additions, subtractions and shift operations are each equal in terms of implementation complexity. Second, each multiplication however is assumed by the complexity calculation to involve three times as many operations as the equally complex additions, subtractions and shift operations. With respect to the coding gain calculation, it is assumed that the input is a stationary Markov-1 process with correlation coefficient rho equal to 0.95.

Mathematically, the complexity calculation may be derived in accordance with the following equations. The following equation (10) sets out a scaled DCT-II transform of size N after factorization:

$$C_N^{II}=\Pi_N\Delta_N\tilde{C}_N^{II}, \tag{10}$$

where $\Pi_N$ denotes a matrix defining reordering of coefficients, $\Delta_N$ denotes a diagonal matrix of scale factors, and $\tilde{C}_N^{II}$ denotes a matrix of the remaining scaled transform. Considering these notations, $C_N^{II}$ of equation (10) can be replaced in equation (3) with can be replaced with $\Pi_N\Delta_N\tilde{C}_N^{II}$ to result in the following equation (11):

$$\Pi_N\Delta_N\tilde{C}_N^{II} = P_N\begin{pmatrix}\Pi_{N/2}\Delta_{N/2}\tilde{C}_{N/2}^{II} & 0\\ 0 & D_{N/2}C_{N/2}^{III}R_{N/2}^TJ_{N/2}\end{pmatrix}\begin{pmatrix}I_{N/2} & J_{N/2}\\ J_{N/2} & -I_{N/2}\end{pmatrix}. \tag{11}$$

The algorithm can then be represented in accordance with the following equations (12) and (13):

$$\Pi_N = P_N\begin{pmatrix}\Pi_{N/2} & 0\\ 0 & I_{N/2}\end{pmatrix},\quad \Delta_N = \begin{pmatrix}\Delta_{N/2} & 0\\ 0 & D_{N/2}\end{pmatrix}, \tag{12}$$

$$\tilde{C}_N^{II} = \begin{pmatrix}\tilde{C}_{N/2}^{II} & 0\\ 0 & C_{N/2}^{III}R_{N/2}^TJ_{N/2}\end{pmatrix}\begin{pmatrix}I_{N/2} & J_{N/2}\\ J_{N/2} & -I_{N/2}\end{pmatrix}. \tag{13}$$

The following equations (14) and (15) represents general complexity estimates for full and scaled implementations of N sized DCT-II:

$$\text{Full DCT-III: } \alpha m+\beta a+\gamma s,\text{ and} \tag{14}$$

$$\text{Scaled DCT-II: } \delta m+\epsilon a+\zeta s, \tag{15}$$

where "m" denotes a number of multiplications in an implementation, "a" denotes a number of additions in the implementation, and "s" denotes a number of shifts in the implementation. The "α" and "δ" variables are controllable factors for increasing or decreasing the magnitude of complexity for the multiplication operations, which under the above assumptions is equal to three. The "β" and "ϵ" are controllable factors for increasing or decreasing the magnitude of complexity for the addition operations, which under the above assumptions is equal to one. The "γ" and "ζ" are controllable factors for increasing or decreasing the magnitude of complexity for the shift operations, which under the above assumptions is equal to one. From these equations, a complexity calculation is derived from equations (14) and (15) given the algorithms output determined from equation (13), where this complexity calculation is represented by the following equation (16):

$$(\alpha+\delta)m+(\beta+\epsilon+3N-1)a+(\gamma+\zeta+1)s. \tag{16}$$

As shown in FIG. 6, graph 110 includes a set of points, each of which is shown as a various shape, with in some instances, different types of shading. For the dyadic sized DCTs-II, a size 2 (or 2×2 or 2-point) DCT-II is represented by an unfilled square, a size 4 (or 4×4 or 4-point) DCT-II is represented by an unfilled triangle and a size 8 DCT-II is represented by an unfilled circle. For the non-dyadic sized DCTs-II, a size 3 (or 3×3 or 3-point) DCT-II is represented by a filled circle, a size 6 (or 6×6 or 6-point) DCT-II is represented by an "X," and a size 12 (or 12×12 or 12-point) DCT-II is represented by a square filled with an "X."

Under the above assumptions and given the above key, graph 110 shows that the implementation of the dyadic size 2 DCT-II provides the lowest coding gain with the lowest implementation complexity. Performing the non-dyadic size 3 DCT-II provides almost 2 dB of coding gain over similarly sized DCT-II of size 2 with only minimal increases in complexity relative to the implementation of the size 2 (or 2×2) DCT-II. The implementation of the dyadic size 4 (or 4×4) DCT-II provides less than approximately 1 dB of coding gain over performing similarly sized DCT-II of size 3 with a large (relative to the increase in complexity from the size 2 to size 3 implementations) increase in complexity.

Performing the non-dyadic size 6 DCT-II with the implementation defined by the techniques of this disclosure provides approximately a 1 dB coding gain over similarly sized DCT-II of size 4 with a small (again relative to the increase in complexity from size 3 to size 4 implementations) increase in complexity. The implementation of the dyadic size 8 DCT-II provides approximately a half dB coding gain over performing a similarly sized DCT-II of size 6 with the implementation defined by the techniques of this disclosure but suffers from a large (relative to the increase from size 4 to size 6) increase in complexity. Performing the non-dyadic size 12 DCT-II with the implementation defined in accordance with the techniques of this disclosure provides approximately a third (⅓) increase in coding gain over similarly sized DCT-II of size 8 with only a small increase in implementation complexity.

In this respect, performing non-dyadic sized DCTs-II with the implementation defined in accordance with the techniques of this disclosure may be more efficient in terms of coding gain to implementation complexity ratios than similarly sized dyadic sized DCTs-II, which may also be performed in accordance with the techniques of this disclosure. While not specifically denoted above, each of the dyadic and non-dyadic sized DCTs-II were performed by a scaled implementations rather than a non-scaled or full implementation, as the scaled implementation is, for the reasons described in this disclosure, generally more efficient than the non-scaled implementation. While discussed with respect to a scaled implementation, the same benefits may accrue to a non-scaled, non-dyadic DCTs-II, typically providing better coding gain to complexity rations than non-scaled, dyadic DCTs-II. In this respect, the factorization aspect of the algorithm may be removed, but still result in more efficient non-scaled or full implementations of non-dyadic DCTs-II when compared with non-scaled, dyadic DCTs-II.

Figure 7:
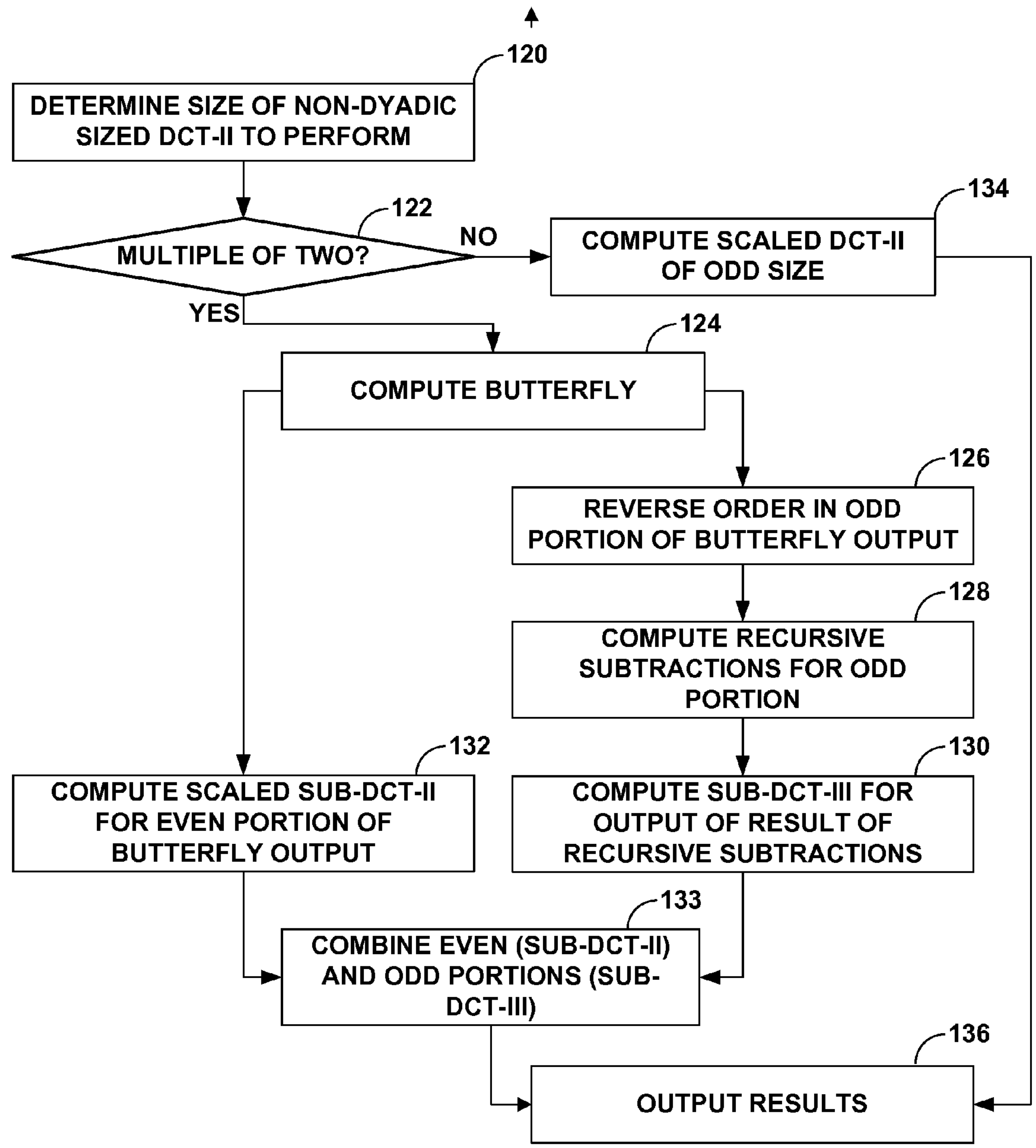
FIG. 7 is a flowchart illustrating an example recursive iteration performed by a scaled non-dyadic sized DCT-II unit implemented in accordance with the techniques described in this disclosure.

FIG. 7 is a flowchart illustrating an example recursive iteration performed by a scaled non-dyadic sized DCT-II unit, such as non-dyadic sized DCT-II unit 52 shown in the example of FIG. 2, implemented in accordance with the techniques described in this disclosure. Again, the recursive algorithm or process may be implemented as a plurality of instructions, such as a computer program, stored on a computer-readable storage medium that cause a processor to carry out the algorithm described in this disclosure. Alternatively, dedicated hardware, such as field programmable gate array (FPGA), an application specific integrated circuit (ASIC), or any other type of similar hardware may implement the techniques of this disclosure so as to perform a DCT-II of any given non-dyadic or even size using the recursive iteration demonstrated with respect to the example of FIG. 4. The techniques should not be limited to any particular implementation of the recursive algorithm.

The example of FIG. 7 represents an adaption of the techniques described previously with respect to the example of FIGS. 4, 5A-5B. The adaption shown in the example of FIG. 7 involves a different algorithm that produces a scaled DCT-II implementation by way of computing a scaled sub-DCT-II and a full or non-scaled sub-DCT-III, rather than a full sub-DCT-II and a full sub-DCT-III. This adapted algorithm results in a scaled implementation of the DCT-II that does not include factors 106 shown with respect to the exemplary implementation of FIG. 5B.

Figure 8:
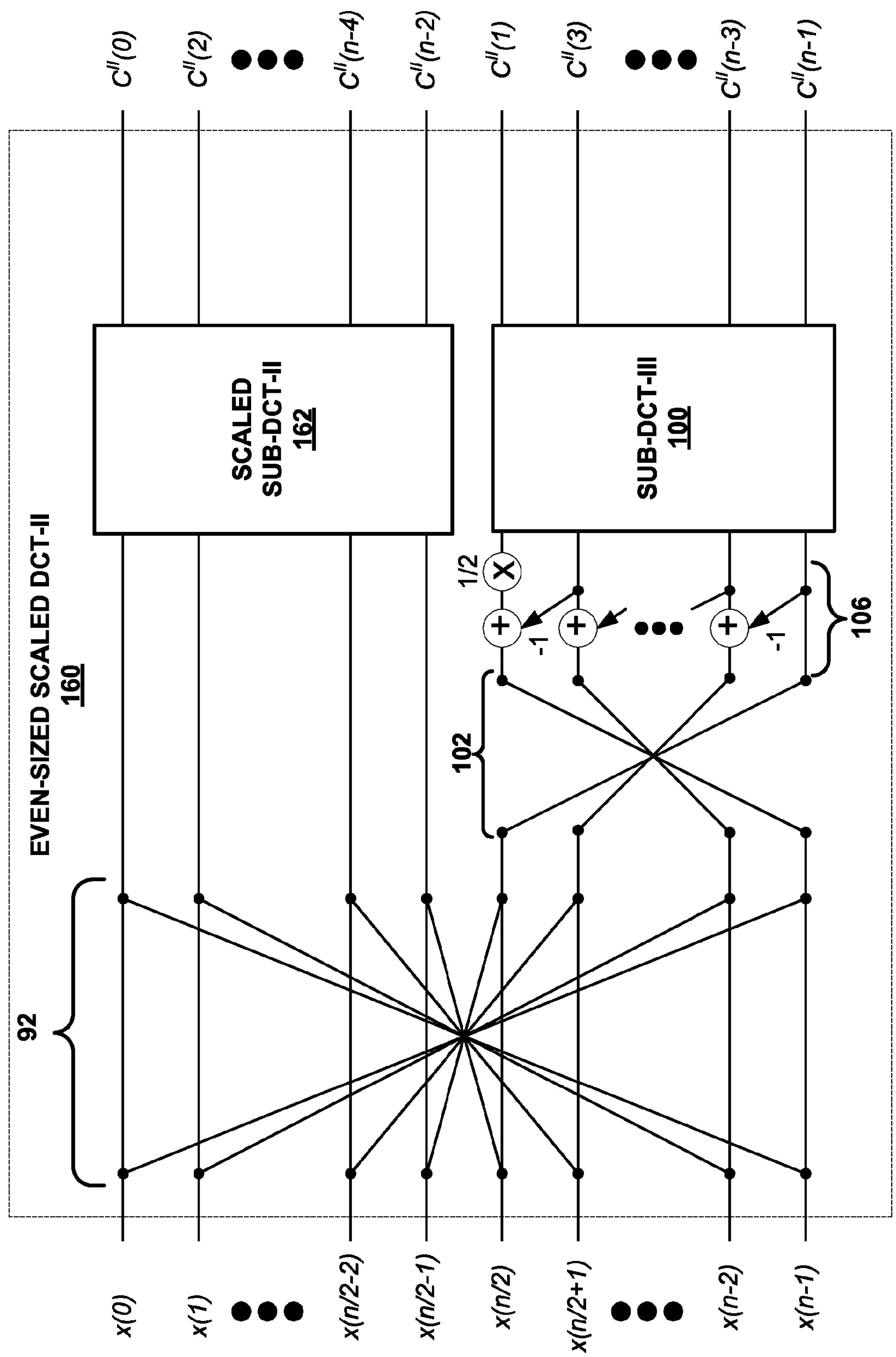
FIG. 8 is a block diagram illustrating an iteration of the recursive techniques described in this disclosure to perform an even-sized scaled DCT-II of size n.

Initially, DCT-II unit 52 determines a size of a non-dyadic DCT-II to perform (120). Usually, DCT-II unit 52 bases this determination on a size of a block of residual data that DCT-II unit 52 receives. If it is determined that the size of the residual block of data is a multiple of two ("YES" 122), DCT-II unit 52 computes a butterfly that includes cross-additions and cross-subtractions of inputs values to DCT-II unit 52 (124), where the input values may include residual block values in the example of a video encoder. The butterfly generally includes an even portion that cross-subtracts and/or cross-adds a first sub-set of the inputs, which may be referred to as the even inputs, and a odd portion that cross-subtracts and/or cross-adds a second sub-set of the inputs, which may be referred to as the odd inputs. DCT-II unit 52 then reverses the order of the odd inputs for the odd portion of the non-dyadic sized DCT-II (126), as shown in the example of FIG. 8 below. DCT-II unit 52, also in accordance with the recursive techniques of this disclosure, computes a series of recursive subtractions for the odd portion of the implementation, which again is shown below with respect to the example of FIG. 9 (128). DCT-II unit 52 then directly computes sub-DCT-III of a size one half that of the size of the DCT-II to perform using the result of the recursive subtractions as inputs (130).

Meanwhile, either before, after or concurrently with reversing the order of the odd portion, computing the recursive subtractions and computing sub-DCT-III, DCT-II unit 52 computes a scaled sub-DCT-II of a size half that of the determined size of the DCT-II to perform for the even portion of the butterfly output (132). To compute this sub-DCT-II for the even portion of the butterfly output, DCT-II unit 52 generally performs another recursive iteration whereby the sub-DCT-II of the size half that of the determined size of the DCT-II to perform undergoes steps 120-132 described above. This recursive iteration repeats until one of the scaled sub-DCT-IIs is an odd size, whereupon DCT-II unit 52 determines the size of this scaled sub-DCT-II is not a multiple of two ("NO" 122) and directly computes the sub-DCT-II of the odd size (134). The term "directly compute" as used herein again refers to a process of accessing a library or data store that stores the matrix coefficients used to determine a DCT-II or DCT-III of a particular size. DCT-II unit 52, after computing the sub-DCT-II and sub-DCT-III combines the results from the even (sub-DCT-II) and odd portions (sub-DCT-III) (133).

In any event, after computing either a scaled sub-DCT-II of an even size or odd size or after computing the sub-DCT-III, the recursive iteration ends by outputting the result as DCT coefficients (136). The output results may be stored considering that returning from a single recursive iteration may result in returning to a previous recursive iteration, whereupon more results are output once that recursive iteration finishes and so on until all of the result are output as DCT coefficients. In this respect, the techniques may provide for a scaled DCT-II implementation that is capable of performing a DCT-II for any sized input block of data while also promoting decreased implementation complexity and increased coding efficiency, especially when considering scaled DCTs-II of non-dyadic sizes, relative to convention dyadic-sized DCTs-II.

FIG. 8 is a block diagram illustrating an iteration of the recursive techniques described in this disclosure to perform an even-sized scaled DCT-II 160 of size n. DCT-III 160 is similar to non-dyadic sized DCT-II implementation 90 shown in the example of FIG. 5B, except that sub-DCT-II 94 has been replaced with a scaled sub-DCT-II 162 and factors 104 have been removed. That is, the odd portion of scaled DCT-II implementation 160, which includes order-reversal unit 102, recursive subtractions 106 and sub-DCT-III implementation 108, may be computed directly from an even-sized DCT-II, such as even-sized DCT-II 90 shown in the example of FIG. 5A. This computation may inherently involve removal of factors by way of directly computing the odd portion in a manner such that the odd portion does not include these factors. In this sense, factors 104 have been removed from the implementation of sub-DCT-IV referred to in the equations above. As described above, quantization factors may have been updated to account for factors 104. This reduces the overall implementation complexity of video encoders and decoders, such as video encoder 20 and video decoder 26.

While described in this disclosure with respect to non-dyadic sized DCTs, the techniques may apply to dyadic sized DCTs to determine efficient, if not optimal, implementations of these dyadic sized DCTs. However, as shown in the following FIG. 6, non-dyadic sized DCTs may provide better coding efficiency to implementation complexity ratios than dyadic sized DCTs, which in turn may improve coding without overly increasing implementation complexity.

The techniques of this disclosure may be implemented in a wide variety of devices or apparatuses, including a wireless communication device handset such as a mobile phone, an integrated circuit (IC) or a set of ICs (i.e., a chip set). Any components, modules or units have been described provided to emphasize functional aspects and does not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable medium comprising instructions that, when executed in a processor, performs one or more of the methods described above. The computer-readable medium may comprise a computer-readable storage medium that is a physical structure, and may form part of a computer program product, which may include packaging materials. In this sense, the computer readable medium may be non-transitory. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The code or instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications, some of which may include use in wireless communication devices, such as mobile telephone handsets.

Various aspects of the techniques have been described. These and other aspects are within the scope of the following claims.

The invention claimed is:

1. A method of performing a discrete cosine transform of type II (DCT-II), the method comprising:

determining, with an apparatus, whether a size of the DCT-II to perform is a multiple of two; and in response to determining that the size of the DCT-II to perform is a multiple of two, performing, with the apparatus, the DCT-II, wherein performing the DCT-II includes:

computing a butterfly that includes cross-additions and cross-subtractions of inputs to the DCT-II, wherein the butterfly includes a first portion that cross-adds a first sub-set of the inputs and a second portion that cross-subtracts a second sub-set of the inputs;

reversing an order of the second sub-set of cross-subtracted inputs to generate a reverse-ordered second sub-set of the inputs;

computing a series of recursive subtractions that each recursively subtract the reverse-ordered second sub-set of the inputs to generate a recursively subtracted second sub-set of the inputs;

computing a sub-DCT-II that receives the first sub-set of the inputs and generates a first set of outputs based on the first sub-set of the inputs;

computing a full sub-DCT-III that receives the recursively subtracted second sub-set of the inputs and generates a second set of outputs based on the recursively subtracted second sub-set of the inputs; and reordering the first and second set of outputs produced by the respective sub-DCT-II and full sub-DCT-III to generate output values of the DCT-II.

2. The method of claim 1, wherein computing the butterfly, reversing the order, computing the series of recursive subtractions, computing the sub-DCT-II, and computing the full sub-DCT-III occurs recursively with respect to the sub-DCT-II until a size of any additional sub-DCTs-II produced through the recursion is not a multiple of two.

3. The method of claim 1, further comprising:

determining whether the sub-DCT-II is of a size that is a multiple of two;

in response to the determination that the sub-DCT-II is of a size that is a multiple of two, performing the sub-DCT-II, wherein performing the sub-DCT-II includes:

computing another butterfly that includes cross-additions and cross-subtractions of inputs to the sub-DCT-II, wherein the butterfly includes a first portion that generates a first sub-set of the inputs to the sub-DCT-II and a second portion that generates a second sub-set of the inputs to the sub-DCT-II;

reversing an order of the second sub-set of cross-subtracted inputs that input the sub-DCT-II to generate a reverse-ordered second sub-set of the inputs to the sub-DCT-II;

computing a series of recursive subtractions that each recursively subtract the reverse-ordered second sub-set of the inputs that input to the sub-DCT-II to generate a recursively subtracted second sub-set of the inputs to the sub-DCT-II;

computing an additional sub-DCT-II that receives the first sub-set of the inputs to the sub-DCT-II and generates a first set of outputs based on the first sub-set of the inputs to the sub-DCT-II;

computing an additional full sub-DCT-III that receives the recursively subtracted second sub-set of the inputs to the sub-DCT-II and generates a second set of outputs based on the recursively subtracted second sub-set of the inputs to the sub-DCT-II; and reordering the first and second set of outputs produced by the respective additional sub-DCT-II and full sub-DCT-III to generate output values of the DCT-II.

4. The method of claim 1, wherein the DCT-II to perform comprises a scaled DCT-II to perform, wherein computing a sub-DCT-II comprises computing a scaled sub-DCT-II that receives the first sub-set of the inputs and generates the first set of outputs based on the first sub-set of the inputs, wherein the first set of outputs comprise a first scaled set of outputs.

5. The method of claim 4, further comprising configuring quantization coefficients of a quantization matrix to account for factors inherently removed when computing the scaled DCT-II without increasing an implementation complexity of the quantization matrix.

6. The method of claim 4, wherein computing the scaled sub-DCT-II comprises computing the scaled sub-DCT-II in a manner that inherently removes factors so as to reduce an implementation complexity of the scaled DCT-II.

7. The method of claim 4, wherein the apparatus comprises a video coder, wherein determining whether the size of the scaled DCT-II to perform is a multiple of two comprises:

receiving a block of residual video data;

determining whether the size of the block of residual video data is of a size that is a multiple of two; and determining, based on the size of the block of residual video data, whether the size of the scaled DCT-II to perform is a multiple of two, wherein the output values comprise DCT coefficients, and wherein the method further comprises performing quantization with a quantization unit of the video coder to quantize the DCT coefficients in accordance with quantization coefficients that account for factors inherently removed when computing the performing the scaled DCT-II without increasing an implementation complexity of the video coder.

8. The method of claim 1, wherein the apparatus comprises one or more of a video encoder, a video decoder, an audio encoder, an audio decoder, an image encoder and an image decoder.

9. The method of claim 1, further comprising, in response to determining that the size of the DCT-II to perform is not a multiple of two, computing the DCT-II directly to generate additional outputs without computing a butterfly, reversing the order of the second sub-set of cross-subtracted inputs, computing the series of recursive subtractions, computing the sub-DCT-II, computing the full sub-DCT-III, and reordering the first and second set of outputs.

10. The method of claim 1, wherein the DCT-II to perform comprises a full DCT-II to perform, wherein computing a sub-DCT-II comprises computing a full sub-DCT-II that receives the first sub-set of the inputs and generates the first set of outputs based on the first sub-set of the inputs, wherein performing the DCT-II further comprises multiplying the first set of outputs by one or more scale factors to generate the first set of outputs, and wherein the first set of outputs comprise a first full set of outputs.

11. A media coding device comprising:

a DCT-II unit that determines whether a size of a DCT-II to perform is a multiple of two, and in response to determining that the size of the DCT-II to perform is a multiple of two, performs the DCT-II, wherein the DCT-II unit includes:

a butterfly unit that computes a butterfly that includes cross-additions and cross-subtractions of inputs to the DCT-II, wherein the butterfly unit includes a first portion that cross-adds a first sub-set of the inputs and a second portion that cross-subtracts a second sub-set of the inputs;

an order reversal unit that reverses an order of the second sub-set of cross-subtracted inputs to generate a reverse-ordered second sub-set of the inputs;

a recursive subtraction unit that computes a series of recursive subtractions that each recursively subtract the reverse-ordered second sub-set of the inputs to generate a recursively subtracted second sub-set of the inputs;

a sub-DCT-II unit that computes a sub-DCT-II that receives the first sub-set of the inputs and generates a first set of outputs based on the first sub-set of the inputs; and a full sub-DCT-III unit that computes a full sub-DCT-III that receives the recursively subtracted second sub-set of the inputs and generates a second set of outputs based on the recursively subtracted second sub-set of the inputs, wherein the DCT-II unit reorders the first and second set of outputs produced by the respective sub-DCT-II and full sub-DCT-III to generate output values of the DCT-II.

12. The media coding device of claim 11, wherein the DCT-II unit computes the butterfly, reverses the order, computes the series of recursive subtractions, computes the sub-DCT-II, and computes the full sub-DCT III recursively with respect to the sub-DCT-II until a size of any additional sub-DCTs-II produced through the recursion is not a multiple of two.

13. The media coding device of claim 11, wherein the sub-DCT-II unit determines whether the sub-DCT-II is of a size that is a multiple of two, and in response to determining that the sub-DCT-II is of a size that is a multiple of two, performs the sub-DCT-II, wherein the sub-DCT-II unit includes:

an additional butterfly unit computes another butterfly that includes cross-additions and cross-subtractions of inputs to the sub-DCT-II, wherein the butterfly includes a first portion that generates a first sub-set of the inputs to the sub-DCT-II and a second portion that generates a second sub-set of the inputs to the sub-DCT-II;

an additional order reversal unit reverses an order of the second sub-set of cross-subtracted inputs that input the sub-DCT-II to generate a reverse-ordered second sub-set of the inputs to the sub-DCT-II;

an additional recursive subtraction unit computes a series of recursive subtractions that each recursively subtract the reverse-ordered second sub-set of the inputs that input to the sub-DCT-II to generate a recursively subtracted second sub-set of the inputs to the sub-DCT-II;

an additional sub-DCT-II unit computes an additional sub-DCT-II that receives the first sub-set of the inputs to the sub-DCT-II and generates a first set of outputs based on the first sub-set of the inputs to the sub-DCT-II;

an additional full sub-DCT-II unit computes an additional full sub-DCT-III that receives the recursively subtracted second sub-set of the inputs to the sub-DCT-II and generates a second set of outputs based on the recursively subtracted second sub-set of the inputs to the sub-DCT-II, and wherein the sub-DCT-II unit reorders the first and second set of outputs produced by the respective additional sub-DCT-II unit and full sub-DCT-III unit to generate output values of the DCT-II.

14. The media coding device of claim 11, wherein the DCT-II unit comprises a scaled DCT-II unit to perform a scaled DCT-II, and wherein the sub-DCT-II unit comprises a scaled sub-DCT-II unit that computes a scaled sub-DCT-II that receives the first sub-set of the inputs and generates the first set of outputs based on the first sub-set of the inputs, and wherein the first set of outputs comprise a first scaled set of outputs.

15. The media coding device of claim 14, further comprising a quantization unit that includes a quantization matrix that account for factors inherently removed when computing the scaled DCT-II without increasing an implementation complexity of the quantization matrix.

16. The media coding device of claim 14, wherein the scaled sub-DCT-II unit computes the scaled sub-DCT-II in a manner that inherently removes factors so as to reduce an implementation complexity of the scaled DCT-II unit.

17. The media coding device of claim 14, wherein the media coding device comprises a video coder, wherein the scaled DCT-II unit receives a block of residual video data, determines whether the size of the block of residual video data is of a size that is a multiple of two and determines, based on the size of the block of residual video data, whether the size of the scaled DCT-II to perform is a multiple of two, wherein the output values comprise DCT coefficients, and wherein the media coding device further comprises a quantization unit that quantizes the DCT coefficients in accordance with quantization coefficients that account for factors inherently removed when computing the performing the scaled DCT-II without increasing an implementation complexity of the video coder.

18. The media coding device of claim 11, wherein the media coding device comprises one or more of a video encoder, a video decoder, an audio encoder, an audio decoder, an image encoder and an image decoder.

19. The media coding device of claim 11, wherein the DCT-II unit, in response to determining that the size of the DCT-II to perform is not a multiple of two, computes the DCT-II directly to generate additional outputs without computing a butterfly, reversing the order of the second sub-set of cross-subtracted inputs, computing the series of recursive subtractions, computing the sub-DCT-II, computing the full sub-DCT-III, and reordering the first and second set of outputs.

20. The media coding device of claim 11, wherein the DCT-II unit comprises a full DCT-II unit to perform a full DCT-II, wherein the sub-DCT-II unit comprises a full sub-DCT-II unit that computes a full sub-DCT-II that receives the first sub-set of the inputs and generates the first set of outputs based on the first sub-set of the inputs, wherein the DCT-II unit further multiplies the first set of outputs by one or more scale factors to generate the first set of outputs, and wherein the first set of outputs comprise a first full set of outputs.

21. A non-transitory computer-readable medium comprising instructions for causing a processor to:

determine whether a size of a DCT-II to perform is a multiple of two; and in response to determining that the size of the DCT-II to perform is a multiple of two, perform the DCT-II, wherein the instructions that cause the processor to perform the DCT-II include instructions that cause the processor to:

compute a butterfly that includes cross-additions and cross-subtractions of inputs to the DCT-II, wherein the butterfly includes a first portion that cross-adds a first sub-set of the inputs and a second portion that cross-subtracts a second sub-set of the inputs;

reverse an order of the second sub-set of cross-subtracted inputs to generate a reverse-ordered second sub-set of the inputs;

compute a series of recursive subtractions that each recursively subtract the reverse-ordered second sub-set of the inputs to generate a recursively subtracted second sub-set of the inputs;

compute a sub-DCT-II that receives the first sub-set of the inputs and generates a first set of outputs based on the first sub-set of the inputs;

compute a full sub-DCT-III that receives the recursively subtracted second sub-set of the inputs and generates a second set of outputs based on the recursively subtracted second sub-set of the inputs; and reorder the first and second set of outputs produced by the respective sub-DCT-II and full sub-DCT-III to generate output values of the DCT-II.

22. The non-transitory computer-readable medium of claim 21, wherein the instruction cause the processor to compute the butterfly, reverse the order, compute the series of recursive subtractions, compute the sub-DCT-II, and compute the full sub-DCT-III in a recursive manner with respect to the sub-DCT-II until a size of any additional sub-DCTs-II produced in the recursive manner is not a multiple of two.

23. The non-transitory computer-readable medium of claim 21, wherein the instructions cause the processor to:

determine whether the sub-DCT-II is of a size that is a multiple of two;

in response to the determination that the sub-DCT-II is of a size that is a multiple of two, perform the sub-DCT-II, wherein the instructions that cause the processor to perform the sub-DCT-II include instructions that cause the processor to:

compute another butterfly that includes cross-additions and cross-subtractions of inputs to the sub-DCT-II, wherein the butterfly includes a first portion that generates a first sub-set of the inputs to the sub-DCT-II and a second portion that generates a second sub-set of the inputs to the sub-DCT-II;

reverse an order of the second sub-set of cross-subtracted inputs that input the sub-DCT-II to generate a reverse-ordered second sub-set of the inputs to the sub-DCT-II;

compute a series of recursive subtractions that each recursively subtract the reverse-ordered second sub-set of the inputs that input to the sub-DCT-II to generate a recursively subtracted second sub-set of the inputs to the sub-DCT-II;

compute an additional sub-DCT-II that receives the first sub-set of the inputs to the sub-DCT-II and generates a first set of outputs based on the first sub-set of the inputs to the sub-DCT-II;

compute an additional full sub-DCT-III that receives the recursively subtracted second sub-set of the inputs to the sub-DCT-II and generates a second set of outputs based on the recursively subtracted second sub-set of the inputs to the sub-DCT-II; and reorder the first and second set of outputs produced by the respective additional sub-DCT-II and full sub-DCT-III to generate output values of the DCT-II.

24. The non-transitory computer-readable medium of claim 21 wherein the DCT-II to perform comprises a scaled DCT-II to perform, and wherein the instructions comprise instructions that further cause the processor to compute a scaled sub-DCT-II that receives the first sub-set of the inputs and generates the first set of outputs based on the first sub-set of the inputs wherein the first set of outputs comprise a first scaled set of outputs.

25. The non-transitory computer-readable medium of claim 24, wherein the instructions further cause the processor to compute the scaled sub-DCT-II in a manner that inherently removes factors so as to reduce an implementation complexity of the scaled DCT-II.

26. The non-transitory computer-readable medium of claim 24, wherein the instructions further cause the processor to:

receive a block of residual video data determine whether the size of the block of residual video data is of a size that is a multiple of two; and determine, based on the size of the block of residual video data, whether the size of the scaled DCT-II to perform is a multiple of two, wherein the output values comprise DCT coefficients, and wherein the instructions further cause the processor to quantize the DCT coefficients in accordance with quantization coefficients that account for factors inherently removed when computing the performing the scaled DCT-II without increasing an implementation complexity of the processor.

27. The non-transitory computer-readable medium of claim 21, wherein the instructions further cause the processor to, in response to determining that the size of the DCT-II to perform is not a multiple of two, compute the DCT-II directly to generate additional outputs without computing a butterfly, reversing the order of the second sub-set of cross-subtracted inputs, computing the series of recursive subtractions, computing the sub-DCT-II, computing the full sub-DCT-III, and reordering the first and second set of outputs.

28. The non-transitory computer-readable medium of claim 21 wherein the DCT-II to perform comprises a full DCT-II to perform, and wherein the instructions further cause the processor to:

compute a full sub-DCT-II that receives the first sub-set of the inputs and generates the first set of outputs based on the first sub-set of the inputs; and multiply the first set of outputs by one or more scale factors to generate the first set of outputs, wherein the first set of outputs comprise a first full set of outputs.

29. An apparatus comprising:

means for determining whether a size of a DCT-II to perform is a multiple of two; and means for performing, in response to determining that the size of the DCT-II to perform is a multiple of two, the DCT-II, wherein the means for performing the DCT-II includes:

means for computing a butterfly that includes cross-additions and cross-subtractions of inputs to the DCT-II, wherein the butterfly includes a first portion that cross-adds a first sub-set of the inputs and a second portion that cross-subtracts a second sub-set of the inputs;

means for reversing an order of the second sub-set of cross-subtracted inputs to generate a reverse-ordered second sub-set of the inputs;

means for computing a series of recursive subtractions that each recursively subtract the reverse-ordered second sub-set of the inputs to generate a recursively subtracted second sub-set of the inputs;

means for computing a sub-DCT-II that receives the first sub-set of the inputs and generates a first set of outputs based on the first sub-set of the inputs;

means for computing a full sub-DCT-III that receives the recursively subtracted second sub-set of the inputs and generates a second set of outputs based on the recursively subtracted second sub-set of the inputs; and means for reordering the first and second set of outputs produced by the respective sub-DCT-II and full sub-DCT-III to generate output values of the DCT-II.

30. The apparatus of claim 29, wherein the means for performing the DCT-II recursively performs the DCT-II with respect to the sub-DCT-II until a size of any additional sub-DCTs-II produced through the recursion is not a multiple of two.

31. The apparatus of claim 29, further comprising:

means for determining whether the sub-DCT-II is of a size that is a multiple of two;

means for performing, in response to the determination that the sub-DCT-II is of a size that is a multiple of two, the sub-DCT-II, wherein the means for performing the sub-DCT-II includes:

means for computing another butterfly that includes cross-additions and cross-subtractions of inputs to the sub-DCT-II, wherein the butterfly includes a first portion that generates a first sub-set of the inputs to the sub-DCT-II and a second portion that generates a second sub-set of the inputs to the sub-DCT-II;

means for reversing an order of the second sub-set of cross-subtracted inputs that input the sub-DCT-II to generate a reverse-ordered second sub-set of the inputs to the sub-DCT-II;

means for computing a series of recursive subtractions that each recursively subtract the reverse-ordered second sub-set of the inputs that input to the sub-DCT-II to generate a recursively subtracted second sub-set of the inputs to the sub-DCT-II;

means for computing an additional sub-DCT-II that receives the first sub-set of the inputs to the sub-DCT-II and generates a first set of outputs based on the first sub-set of the inputs to the sub-DCT-II;

means for computing an additional full sub-DCT-III that receives the recursively subtracted second sub-set of the inputs to the sub-DCT-II and generates a second set of outputs based on the recursively subtracted second sub-set of the inputs to the sub-DCT-II; and means for reordering the first and second set of outputs produced by the respective additional sub-DCT-II and full sub-DCT-III to generate output values of the DCT-II.

32. The apparatus of claims 29, wherein the means for performing the DCT-II comprises means for performing a scaled DCT-II, wherein the means for computing the sub-DCT-II comprises means for computing a scaled sub-DCT-II that receives the first sub-set of the inputs and generates the first set of outputs based on the first sub-set of the inputs, and wherein the first set of outputs comprises a first scaled set of outputs.

33. The apparatus of claim 32, further comprising means for configuring quantization coefficients of a quantization matrix to account for factors inherently removed when computing the scaled DCT-II without increasing an implementation complexity of the quantization matrix.

34. The apparatus of claim 32, wherein the means for computing the scaled sub-DCT-II comprises means for computing the scaled sub-DCT-II in a manner that inherently removes factors so as to reduce an implementation complexity of the scaled DCT-II.

35. The apparatus of claim 32, wherein the apparatus comprises a video coder, wherein the means or determining whether the size of the scaled DCT-II to perform is a multiple of two comprises:

means for receiving a block of residual video data;

means for determining whether the size of the block of residual video data is of a size that is a multiple of two; and means for determining, based on the size of the block of residual video data, whether the size of the scaled DCT-II to perform is a multiple of two, wherein the output values comprise DCT coefficients, and wherein apparatus comprises means for quantizing the DCT coefficients in accordance with quantization coefficients that account for factors inherently removed when computing the performing the scaled DCT-II without increasing an implementation complexity of the video coder.

36. The apparatus of claim 29, wherein the apparatus comprises one or more of a video encoder, a video decoder, an audio encoder, an audio decoder, an image encoder and an image decoder.

37. The apparatus of claim 29, further comprising means for computing, in response to determining that the size of the DCT-II to perform is not a multiple of two, the DCT-II directly to generate additional outputs without computing a butterfly, reversing the order of the second sub-set of cross-subtracted inputs, computing the series of recursive subtractions, computing the sub-DCT-II, computing the full sub-DCT-III, and reordering the first and second set of outputs.

38. The apparatus of claims 29, wherein the means for performing the DCT-II comprises means for performing a full DCT-II, wherein computing a sub-DCT-II comprises computing a full sub-DCT-II that receives the first sub-set of the inputs and generates the first set of outputs based on the first sub-set of the inputs, wherein the means for performing the full DCT-II further comprises means for multiplying the first set of outputs by one or more scale factors to generate the first set of outputs, and wherein the first set of outputs comprise a first full set of outputs.

* * * * *